(12) United States Patent
Hu et al.

(10) Patent No.: US 11,888,700 B2
(45) Date of Patent: Jan. 30, 2024

(54) METHOD AND APPARATUS FOR FINE-GRAINED ISOLATION IN CN NSS DOMAIN OF E2E NETWORK SLICE

(71) Applicant: Nokia Solutions and Networks Oy, Espoo (FI)

(72) Inventors: Zhiyuan Hu, Shanghai (CN); Jing Ping, Sichuan (CN); Zhigang Luo, Shanghai (CN); Wen Wei, Shanghai (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/007,230

(22) PCT Filed: Aug. 3, 2020

(86) PCT No.: PCT/CN2020/106539
§ 371 (c)(1),
(2) Date: Jan. 27, 2023

(87) PCT Pub. No.: WO2022/027169
PCT Pub. Date: Feb. 10, 2022

(65) Prior Publication Data
US 2023/0283525 A1 Sep. 7, 2023

(51) Int. Cl.
*G06F 15/16* (2006.01)
*H04L 41/122* (2022.01)
*H04L 47/80* (2022.01)

(52) U.S. Cl.
CPC .......... *H04L 41/122* (2022.05); *H04L 47/803* (2013.01)

(58) Field of Classification Search
CPC ............................ H04L 41/122; H04L 47/803
(Continued)

(56) References Cited

U.S. PATENT DOCUMENTS 7,150,021 B1 * 12/2006 Vajjhala ................ G06F 13/364
718/103
7,159,184 B2 * 1/2007 Ullah .................... G06F 9/5027
717/121
(Continued)

FOREIGN PATENT DOCUMENTS

CN 108023749 A 5/2018
CN 109560955 A 4/2019
(Continued)

OTHER PUBLICATIONS

3GPP "Study on management orchestration of network slicing for next generation network" 3GPP TR 28.801 V15.1.0, Jan. 31, 2018 sections 4-7.
(Continued)

*Primary Examiner* — Moustafa M Meky
(74) *Attorney, Agent, or Firm* — Harness, Dickey & Pierce, P.L.C.

(57) ABSTRACT

A method for isolation in the CN domain of a network slice includes receiving a slice isolation policy and establishing a CN NSS isolation policy based on the slice isolation policy. When the CN NSS isolation policy includes a network resource isolation policy, the network resource isolation policy is mapped to a network resource allocation policy, a part of which relating to physical resources is sent to a network function management function (NFMF) and a part relating to virtual resources is sent to a network function virtualization management and orchestration function. When the NSS isolation policy includes an application level isolation policy, the application level isolation policy is mapped to an application level policy which is sent to the NFMF.

8 Claims, 14 Drawing Sheets

(58) Field of Classification Search
USPC .......................................................... 709/226
See application file for complete search history.

(56) References Cited

U.S. PATENT DOCUMENTS

| | | | | |
|---|---|---|---|---|
| 7,475,399 | B2* | 1/2009 | Arimilli | G06F 11/3466 |
| | | | | 712/216 |
| 9,632,827 | B2* | 4/2017 | Ahmed | G06F 9/5027 |
| 10,375,588 | B2* | 8/2019 | Zhu | H04W 24/02 |
| 10,474,488 | B2* | 11/2019 | Aleksandrov | G06F 9/45558 |
| 10,873,540 | B2* | 12/2020 | Nedeltchev | G06F 9/5072 |
| 11,681,562 | B2* | 6/2023 | Ahmed | G06F 9/5061 |
| | | | | 718/104 |
| 2002/0174227 | A1* | 11/2002 | Hartsell | H04L 47/805 |
| | | | | 709/224 |
| 2004/0021678 | A1* | 2/2004 | Ullah | G06F 9/5027 |
| | | | | 715/700 |
| 2005/0154860 | A1* | 7/2005 | Arimilli | G06F 11/3466 |
| | | | | 712/216 |
| 2008/0155100 | A1* | 6/2008 | Ahmed | G06F 9/5061 |
| | | | | 709/226 |
| 2013/0013357 | A1* | 1/2013 | Liu | G06Q 10/06 |
| | | | | 705/7.12 |
| 2017/0280340 | A1* | 9/2017 | Zhu | H04W 76/00 |
| 2018/0013696 | A1* | 1/2018 | Nedeltchev | H04L 43/022 |
| 2018/0101395 | A1* | 4/2018 | Aleksandrov | G06F 9/5077 |
| 2021/0096878 | A1* | 4/2021 | Chomakov | G06F 9/5027 |

FOREIGN PATENT DOCUMENTS

| | | |
|---|---|---|
| CN | 110034944 A | 7/2019 |
| CN | 110401946 A | 11/2019 |
| WO | WO-2017/197273 A1 | 11/2017 |
| WO | WO-2019/096208 A1 | 5/2019 |
| WO | WO-2022/011578 A1 | 1/2022 |

OTHER PUBLICATIONS

Nokia et al "TD proposal for network slice isolation attribute" 3GPP TSG-SA5 Meeting #129e, S5-201382, Mar. 4, 2020, sections 3-4.
International Search Report dated Apr. 29, 2021, issued in corresponding International Application No. PCT/CN2020/106539.

* cited by examiner

METHOD AND APPARATUS FOR FINE-GRAINED ISOLATION IN CN NSS DOMAIN OF E2E NETWORK SLICE

CROSS-REFERENCE TO RELATED APPLICATIONS

This application is a national phase under 35 U.S.C. § 371 of PCT International Application No. PCT/CN2020/106539 which has an International filing date of Aug. 3, 2020, the entire contents of each of which are hereby incorporated by reference.

TECHNICAL FIELD

Various example embodiments described herein generally relate to communication technologies, and more particularly, to communication methods and apparatus supporting fine-grained isolation of a network slice subnet (NSS) in a core network (CN) domain.

BACKGROUND

Certain abbreviations that may be found in the description and/or in the figures are herewith defined as follows:
AN Access Network
CN Core Network
E2E End to End
ID Identifier
NBI North-Bound Interface
NF Network Function
NFMF Network Function Management Function
NFV Network Function Virtualization
NFV-MANO NFV Management and Orchestration
NFVI Network Function Virtualization Infrastructure
NFVO Network Function Virtualization Orchestration
NR New Radio
NS Network Slice
NSMF Network Slice Management Function
NSI Network Slice Instance
NSS Network Slice Subnet
NSSMF Network Slice Subnet Management Function
NSSI Network Slice Subnet Instance
NRM Network Resource Model
PNF Physical Network Function
SDN Software Defined Networking
SMF Session Management Function
TN Transport Network
VLAN Virtual Local Area Network
UPF User Plane Function
VNF Virtualized Network Function
VNFCI VNF Component Infrastructure
VNFM Virtualized Network Function Management
VIM Virtualized infrastructure Manager 5G NR is designed for a wide range of usage scenarios typically including for example enhanced Mobile Broad Band (eMBB), massive Machine Type Communication (mMTC) and ultra Reliable and Low Latency Communication (uRLLC). Many usage scenarios require different types of features and networks in terms of mobility, security, policy control, latency, coverage, reliability and the like. Therefore, network slicing has been proposed to slice one physical network into multiple virtual E2E networks to carry different types of services with different characteristics and requirements. With network slicing, various services for different companies and industries may be provided by one physical network and consequently network utilization is greatly improved.

SUMMARY

A brief summary of exemplary embodiments is provided below to provide basic understanding of some aspects of various embodiments. It should be noted that this summary is not intended to identify key features of essential elements or define scopes of the embodiments, and its sole purpose is to introduce some concepts in a simplified form as a preamble for a more detailed description provided below.

In a first aspect, an example embodiment of a method for isolation of a network slice (NS) in a core network (CN) domain is provided. The method may comprise receiving a slice isolation policy for a network slice subnet (NSS) in the CN domain, and establishing an NSS isolation policy for the CN NSS based on the slice isolation policy, the NSS isolation policy comprising at least one of a network resource isolation policy and an application level isolation policy. In a case where the NSS isolation policy comprises the network resource isolation policy, the network resource isolation policy may be mapped to a network resource allocation policy comprising isolation related requirements of virtual and/or physical resources for a network service. The network resource allocation policy relating to the physical resources is sent to a network function management function (NFMF), and/or the network resource allocation policy relating to the virtual resources is sent to a network function virtualization management and orchestration (NFV-MANO) function for instantiation of the network service. In a case where the NSS isolation policy comprises the application level isolation policy, the application level isolation policy is mapped to an application level policy comprising isolation related requirements for configuration of a network function, and the application level policy is sent to the NFMF for configuring of one or more network functions.

In a second aspect, an example embodiment of a method for network resource isolation of a network slice (NS) in a core network (CN) domain is provided. The method may comprise receiving from a CN network slice subnet (NSS) management function (CN NSSMF) a request for creation of a network service instance and a network resource allocation policy comprising isolation related requirements of virtual resources for the network service instance, creating, responsive to the request, the network service instance by orchestrating network functions according to the network resource allocation policy, and sending the created network service instance to the higher layer.

In a third aspect, an example embodiment of a method for network resource isolation of a network slice (NS) in a core network (CN) domain is provided. The method may comprise receiving from a CN network slice subnet (NSS) management function (CN NSSMF) a network resource allocation policy for a CN NSS comprising isolation related requirements of physical resources, allocating a physical network function (PNF) for the CN NSS according to the network resource allocation policy, and sending the PNF's ID (identifier) to the CN NSSMF.

In a fourth aspect, an example embodiment of a method for application level isolation of a network slice (NS) in a core network (CN) domain is provided. The method may comprise receiving from a CN network slice subnet (NSS) management function (CN NSSMF) an application level policy for a CN NSS comprising isolation related requirements for configuration of a network function, and configuring at least one network function according to the application level policy.

In a fifth aspect, an example embodiment of a method for monitoring isolation of a network slice subnet (NSS) in a core network (CN) domain is provided. The method may comprise receiving network resource isolation monitoring data of virtual resources for the CN NSS from a network function virtualization management and orchestration (NFV-MANO), receiving network resource isolation monitoring data of physical resources for the CN NSS from a network function management function (NFMF), analyzing the network resource isolation monitoring data to determine if a network resource isolation policy for the CN NSS is satisfied during CN NSS running, and reporting the analysis result of the network resource isolation monitoring data to an isolation monitoring function at a higher layer.

In a sixth aspect, an example embodiment of a method for monitoring network resource isolation of a network slice subnet (NSS) in a core network (CN) domain is provided. The method may comprise collecting isolation monitoring data relating to virtual resources of a network service instance for the CN NSS, and sending the collected isolation monitoring data to an isolation monitoring function at a higher layer.

In a seventh aspect, an example embodiment of a network management unit is provided. The network management unit may comprise at least one processor and at least one memory including computer program code. The at least one memory and the computer program code are configured to, with the at least one processor, cause the network management unit to receive a slice isolation policy for a network slice subnet (NSS) in the CN domain and establish an NSS isolation policy for the CN NSS based on the slice isolation policy, the NSS isolation policy comprising at least one of a network resource isolation policy and an application level isolation policy. In a case where the NSS isolation policy comprises the network resource isolation policy, the network resource isolation policy may be mapped to a network resource allocation policy comprising isolation related requirements of virtual and/or physical resources for a network service. The network resource allocation policy relating to the physical resources may be sent to a network function management function (NFMF), and/or the network resource allocation policy relating to the virtual resources may be sent to a network function virtualization management and orchestration (NFV-MANO) function for instantiation of the network service. In a case where the NSS isolation policy comprises the application level isolation policy, the application level isolation policy may be mapped to an application level policy comprising isolation related requirements for configuration of a network function. The application level policy may be sent to the NFMF for configuring of one or more network functions.

In an eighth aspect, an example embodiment of a network management unit is provided. The network management unit may comprise at least one processor and at least one memory including computer program code. The at least one memory and the computer program code are configured to, with the at least one processor, cause the network management unit to receive from a CN network slice subnet (NSS) management function (CN NSSMF) a request for creation of a network service instance and a network resource allocation policy comprising isolation related requirements of virtual resources for the network service instance, create, responsive to the request, the network service instance by orchestrating network functions according to the network resource allocation policy, and send the created network service instance to the higher layer.

In a ninth aspect, an example embodiment of a network management unit is provided. The network management unit may comprise at least one processor and at least one memory including computer program code. The at least one memory and the computer program code are configured to, with the at least one processor, cause the network management unit to receive from a CN network slice subnet (NSS) management function (CN NSSMF) a network resource allocation policy for a CN NSS comprising isolation related requirements of physical resources, allocate a physical network function (PNF) for the CN NSS according to the network resource allocation policy, and send the PNF's ID (identifier) to the CN NSSMF.

In a tenth aspect, an example embodiment of a network management unit is provided. The network management unit may comprise at least one processor and at least one memory including computer program code. The at least one memory and the computer program code are configured to, with the at least one processor, cause the network management unit to receive from a CN network slice subnet (NSS) management function (CN NSSMF) an application level policy for a CN NSS comprising isolation related requirements for configuration of a network function, and configure at least one network function according to the application level policy.

In an eleventh aspect, an example embodiment of a network management unit is provided. The network management unit may comprise at least one processor and at least one memory including computer program code. The at least one memory and the computer program code are configured to, with the at least one processor, cause the network management unit to receive network resource isolation monitoring data of virtual resources for the CN NSS from a network function virtualization management and orchestration (NFV-MANO), receive network resource isolation monitoring data of physical resources for the CN NSS from a network function management function (NFMF), analyze the network resource isolation monitoring data to determine if a network resource isolation policy for the CN NSS is satisfied during CN NSS running, and report the analysis result of the network resource isolation monitoring data to an isolation monitoring function at a higher layer.

In a twelfth aspect, an example embodiment of a network management unit is provided. The network management unit may comprise at least one processor and at least one memory including computer program code. The at least one memory and the computer program code are configured to, with the at least one processor, cause the network management unit to collect isolation monitoring data relating to virtual resources of a network service instance for the CN NSS, and send the collected isolation monitoring data to an isolation monitoring function at a higher layer.

In a thirteenth aspect, an example embodiment of an apparatus for isolation of a network slice (NS) in a core network (CN) domain is provided. The apparatus may comprise means for receiving a slice isolation policy for a network slice subnet (NSS) in the CN domain, means for establishing an NSS isolation policy for the CN NSS based on the slice isolation policy, the NSS isolation policy comprising at least one of a network resource isolation policy and an application level isolation policy, means for mapping the network resource isolation policy to a network resource allocation policy comprising isolation related requirements of virtual and/or physical resources for a network service in a case where the NSS isolation policy comprises the network resource isolation policy, means for sending the network resource allocation policy relating to the physical resources to a network function management function (NFMF) and/or the network resource allocation policy relating to the virtual resources to a network function virtualization management and orchestration (NFV-MANO) function for instantiation of the network service, means for mapping the application level isolation policy to an application level policy comprising isolation related requirements for configuration of a network function in a case where the NSS isolation policy comprises the application level isolation policy, and means for sending the application level policy to the NFMF for configuring of one or more network functions.

In a fourteenth aspect, an example embodiment of an apparatus for network resource isolation of a network slice (NS) in a core network (CN) domain is provided. The apparatus may comprise means for receiving from a CN network slice subnet (NSS) management function (CN NSSMF) a request for creation of a network service instance and a network resource allocation policy comprising isolation related requirements of virtual resources for the network service instance, means for, responsive to the request, creating the network service instance by orchestrating network functions according to the network resource allocation policy, and means for sending the created network service instance to the higher layer.

In a fifteenth aspect, an example embodiment of an apparatus for network resource isolation of a network slice (NS) in a core network (CN) domain is provided. The apparatus may comprise means for receiving from a CN network slice subnet (NSS) management function (CN NSSMF) a network resource allocation policy for a CN NSS comprising isolation related requirements of physical resources, means for allocating a physical network function (PNF) for the CN NSS according to the network resource allocation policy, and means for sending the PNF's ID (identifier) to the CN NSSMF.

In a sixteenth aspect, an example embodiment of an apparatus for application level isolation of a network slice (NS) in a core network (CN) domain is provided. The apparatus may comprise means for receiving from a CN network slice subnet (NSS) management function (CN NSSMF) an application level policy for a CN NSS comprising isolation related requirements for configuration of a network function, and means for configuring at least one network function according to the application level policy.

In a seventeenth aspect, an example embodiment of an apparatus for monitoring isolation of a network slice subnet (NSS) in a core network (CN) domain is provided. The apparatus may comprise means for receiving network resource isolation monitoring data of virtual resources for the CN NSS from a network function virtualization management and orchestration (NFV-MANO), means for receiving network resource isolation monitoring data of physical resources for the CN NSS from a network function management function (NFMF), means for analyzing the network resource isolation monitoring data to determine if a network resource isolation policy for the CN NSS is satisfied during CN NSS running, and means for reporting the analysis result of the network resource isolation monitoring data to an isolation monitoring function at a higher layer.

In an eighteenth aspect, an example embodiment of an apparatus for monitoring network resource isolation of a network slice subnet (NSS) in a core network (CN) domain is provided. The apparatus may comprise means for collecting isolation monitoring data relating to virtual resources of a network service instance for the CN NSS, and means for sending the collected isolation monitoring data to an isolation monitoring function at a higher layer.

In a nineteenth aspect, an example embodiment of a computer readable medium is provided. The computer readable medium may have instructions stored thereon, and the instructions, when executed by at least one processor of a network management unit, cause the network management unit to perform any one of the above-mentioned methods.

Other features and advantages of the example embodiments of the present disclosure will also be apparent from the following description of specific embodiments when read in conjunction with the accompanying drawings, which illustrate, by way of example, the principles of example embodiments of the present disclosure.

BRIEF DESCRIPTION OF THE DRAWINGS

Some example embodiments will now be described, by way of non-limiting examples, with reference to the accompanying drawings.

Throughout the drawings, same or similar reference numbers indicate same or similar elements. A repetitive description on the same elements would be omitted.

DETAILED DESCRIPTION

Herein below, some example embodiments are described in detail with reference to the accompanying drawings. The following description includes specific details for the purpose of providing a thorough understanding of various concepts. However, it will be apparent to those skilled in the art that these concepts may be practiced without these specific details. In some instances, well known circuits, techniques and components are shown in block diagram form to avoid obscuring the described concepts and features.

A network slice is a logical communication network that operates on top of a physical network, and multiple network slices operating on one physical network may share network resources. A challenge to network slicing is to ensure isolation between network slices because some tenants may need to run a sensitive service in a network slice that is isolated to some extent from other services. E2E network slicing spans across multiple parts of the network such as the access network (AN), the transport network (TN) and the core network (CN), and slice isolation needs to be ensured in each of the AN domain, the TN domain and the CN domain. Hereinafter, example embodiments of network slice isolation in the CN domain will be discussed in detail, and it would be appreciated that some embodiments or at least a part thereof would also be applicable in the AN domain.

Figure 1:
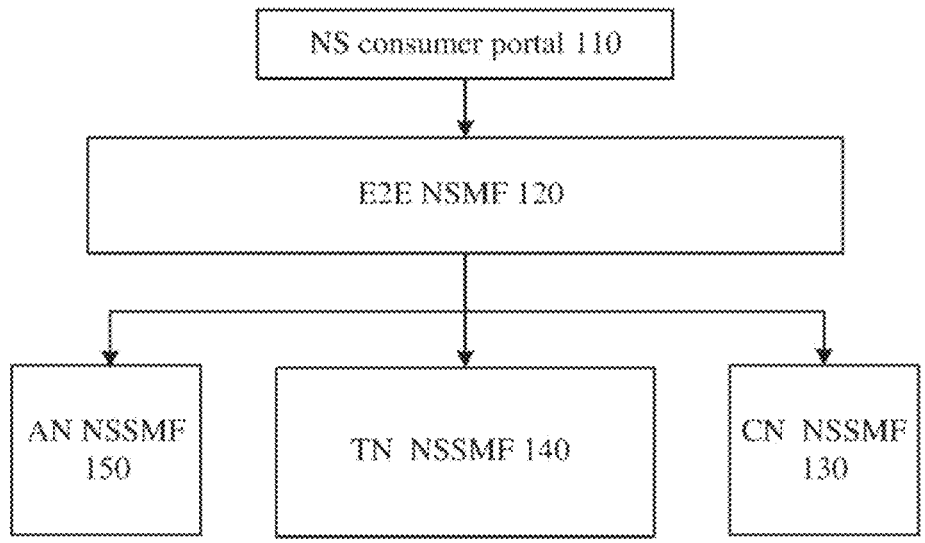
FIG. 1 illustrates a block diagram of E2E network slice management architecture in which example embodiments of the present disclosure can be implemented.

FIG. 1 illustrates architecture of E2E network slice management in which example embodiments of the present disclosure can be implemented. Referring to FIG. 1, a network slice consumer portal 110 is provided for the tenants to conduct control and management on the E2E network slices. For example, the network slice consumer portal 110 may receive from a tenant a request to create an E2E network slice along with a Service Level Agreement (SLA) or a service profile that specifies requirements such as bandwidth, rate, latency, connectivity, mobility or the like for services to be run on the network slice. If the SLA is received, it may be converted into the service profile. The network slice consumer portal 110 may forward the request to create a slice and the service profile to a network slice management function (NSMF) 120 for creation of the slice. The tenant may also for example monitor and update the network slices through the network slice consumer portal 110.

When the NSMF 120 receives the request to create a network slice and the service profile, it may create a network slice instance (NSI) based on the service profile. For example, the NSMF 120 may map the service profile to a slice profile and select a network resource model (NRM) for the slice. The NSMF 120 may further break down the slice profile into domain slice profiles and call domain management functions to create network slice subnets (NSSs) in respective domains based on respective domain slice profiles. For example, the NSMF 120 may call a CN NSS management function (NSSMF) 130 to create an NSS instance (NSSI) in the CN domain, a TN NSSMF 140 to create an NSS instance in the TN domain, and an AN NSSMF 150 to create an NSS instance in the AN domain. It would be understood that the NSMF 120 may include a plurality of logical functions for management and orchestration of network slice instances, such as an NS orchestration function, an NS resource module function, an NS instance inventory function, an NS management function, an NS data collection function, an NS data analytics function and the like. The functions of the NSMF 120 may be deployed as respective stand-alone network management units or modules, or deployed together at the same host device. It would also be understood that the domain NSSMFs 130, 140, 150 may include a plurality of logical functions for management and orchestration of network slice subnets in their own domains. For example, the domain NSSMFs 130, 140, 150 each may include an NSS orchestration function, an NSS resource module function, an NSS instance inventory function, an NSS management function, an NSS data collection function, an NSS data analytics function and the like. The functions of the domain NSSMFs 130, 140, 150 may be deployed as respective stand-alone network management units or modules, or deployed together at the same host device. The architecture shown in FIG. 1 supports service-based interfaces (SBIs) for the functions of the NSMF 120 and the NSSMFs 130, 140, 150, and the functions, also referred to as function units or modules, may be implemented by using hardware or running software on hardware, or may be implemented in a form of virtual functions on a common hardware platform.

It has been recognized by the industries that isolation is an important requirement for the E2E network slices. Isolation refers to a degree of resource sharing that could be tolerated by the tenants, and the tenants may require different levels of isolation. For example, some tenants may not mind to share network resources with others, while some tenants may want to use dedicated physical or logic resources for all or a particular type of service data. Slice isolation in the TN domain has been discussed in a co-owned PCT international patent application No. PCT/CN2020/102006 filed on Jul. 15, 2020 entitled "METHOD AND APPARATUS FOR ISOLATION SUPPORT IN NETWORK SLICING", which is incorporated herein by reference in its entirety. Hereinafter, example embodiments of methods and apparatus for isolation of network slice subnets in the CN domain will be discussed in detail. In some example embodiments, a fine-grained isolation policy could be applied to an E2E network slice, and thereby the network slice can meet various isolation requirements of the tenants.

Figure 2:
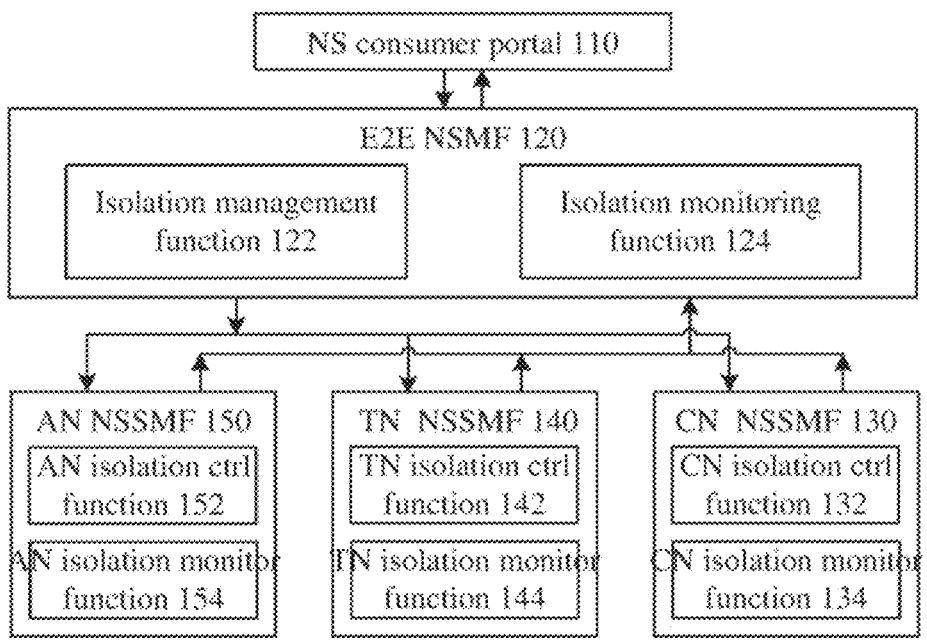
FIG. 2 illustrates a block diagram of functions for network slice management providing E2E slice isolation in accordance with some example embodiments.

FIG. 2 illustrates a block diagram of functions for network slice management providing E2E slice isolation in accordance with some example embodiments. In FIG. 2, network slice management functions the same as or similar to those shown in FIG. 1 are denoted with the same reference signs and repetitive description thereof are omitted herein.

Referring to FIG. 2, at the network slice layer, the NSMF 120 may include an isolation management function 122 and an isolation monitoring function 124, each of which may be deployed as a stand-alone function or deployed together with other functions of the NSMF 120 at the same host device. The isolation management function 122 is provided to apply an isolation policy for a network slice when the network slice is created, and the isolation monitoring function 124 is provided to monitor enforcement of the slice isolation policy during the network slice running.

In some embodiments, the isolation management function 122 may be configured to establish a slice isolation policy for a network slice. For example, when the NSMF 120 receives from the network slice consumer portal 110 a request to create a network slice as well as a service profile for the network slice, the isolation management function 122 may recognize or identify isolation requirements included in the service profile to obtain or derive the slice isolation policy for the network slice. The isolation management function 122 may further break down the slice isolation policy into separate slice isolation policies for the CN NSS, the TN NSS and the AN NSS. The NSMF 120 may also break down the slice profile for the network slice into separate slice profiles for the CN NSS, the TN NSS and the AN NSS. In some embodiments, the separate slice isolation policies may be included in the separate slice profiles. The separate CN/TN/AN NSS slice isolation policies and slice profiles may be sent to the CN/TN/AN NSSMFs 130, 140, 150, respectively, for creation of the CN NSS, the TN NSS and the AN NSS.

In some embodiments, the isolation monitoring function 124 may be configured to receive isolation monitoring data from the CN NSS, the TN NSS and the AN NSS during the network slice running. The isolation monitoring function 124 may further analyze the isolation monitoring data to determine if the slice isolation policy for the network slice is properly enforced during the network slice running. If it is determined that the slice isolation policy is not properly enforced, the isolation monitoring function 124 may generate an alarm and, optionally, trigger re-configuration or re-orchestration of the network slice.

Continue referring to FIG. 2, at the network slice subnet (NSS) layer, the CN NSSMF 130 may include a CN isolation control function 132 and a CN isolation monitoring function 134 for supporting isolation in the CN domain, the TN NSSMF 140 may include a TN isolation control function 142 and a TN isolation monitoring function 144 for supporting isolation in the TN domain, and the AN NSSMF 150 may include an AN isolation control function 152 and an AN isolation monitoring function 154 for supporting isolation in the AN domain. The domain isolation control functions 132/142/152 may assist the domain NSSMFs 130/140/150 to create network slice subnets based on corresponding slice isolation policies, respectively. The domain isolation monitoring functions 134/144/154 may monitor enforcement of the slice isolation policies in the corresponding domains during the network slice subnet running. The domain isolation functions 132, 134, 142, 144, 152, 154 may be deployed as a stand-alone network management function or deployed together with other functions of the corresponding NSSMFs at the same host device. The isolation in the TN domain has been discussed in detail with reference to operations of the TN isolation control function 142 and the TN isolation monitoring function 144 in the PCT patent application PCT/CN2020/102006, and a repetitive description thereof is omitted here. Hereinafter, isolation in the CN domain would be discussed, and it would be appreciated that the embodiments disclosed herein are also applicable at least partially in the AN domain.

Figure 3:
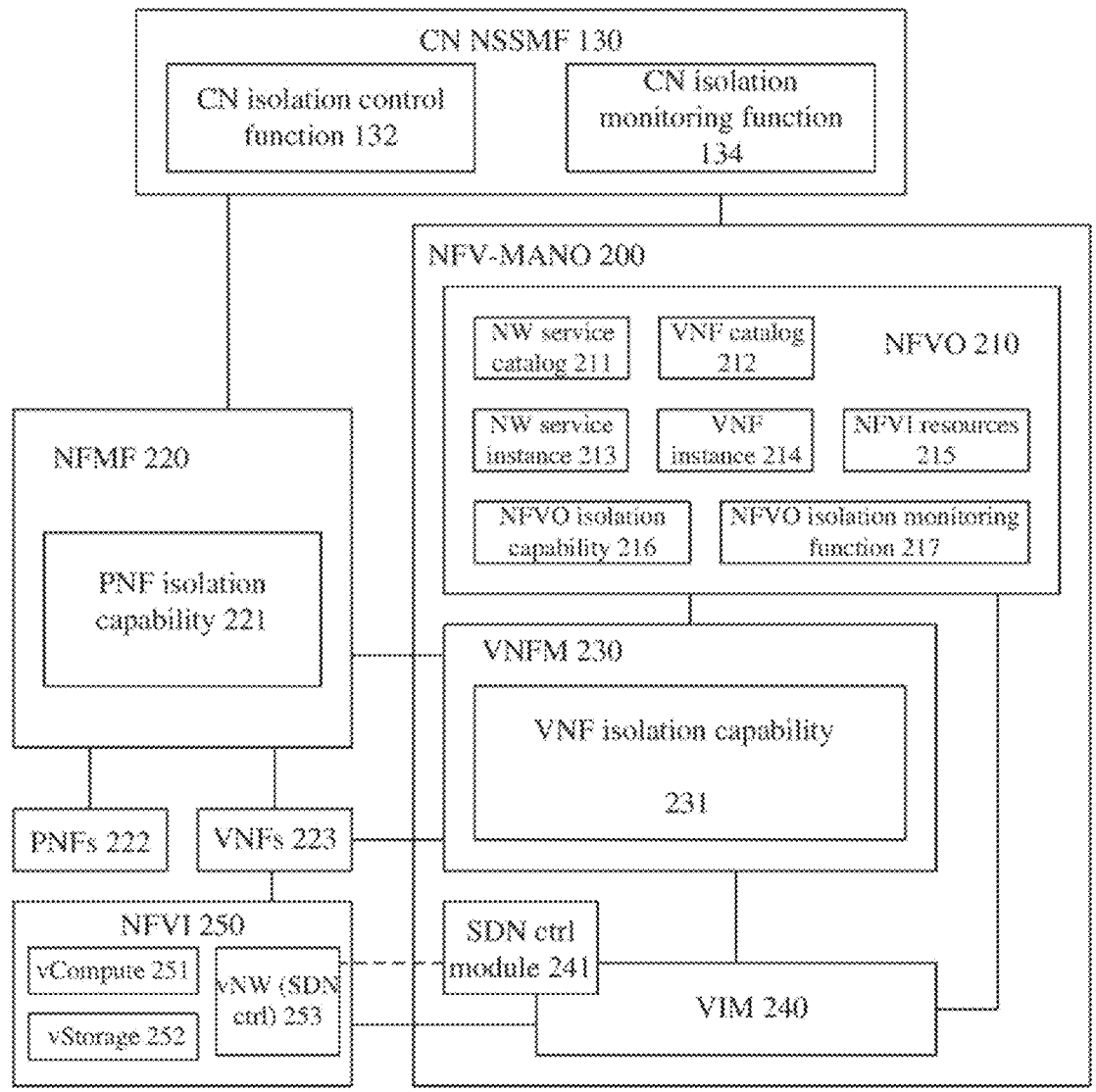
FIG. 3 illustrates a block diagram of functions for network slice management providing slice isolation in the core network (CN) domain in accordance with some example embodiments.

FIG. 3 illustrates a block diagram of functions for network slice subnet management and orchestration providing slice isolation in the core network (CN) domain in accordance with some example embodiments. In the CN domain, a network function virtualization management and orchestration (NFV-MANO) 200 is provided to manage the network function virtualization infrastructure (NFVI) and orchestrate the allocation of resources for network services and virtual network functions (VNFs). The NFV-MANO 200 may receive a request of resource allocation for a network service from the higher layer, i.e., the CN NSSMF 130 or an NSS orchestration function therein, map the received request to an appropriate network service catalog with some network service instance requirements such as bandwidth, latency or the like, and then confirm the resource allocation for the network service instance to the higher layer.

Referring to FIG. 3, the NFV-MANO 200 includes a network functions virtualization orchestrator (NFVO) 210, a virtual network functions management (VNFM) 230 and a virtualized infrastructure manager (VIM) 240. The NFVO 210 may be responsible for orchestration of NFVI resources across multiple VIMs and lifecycle management of network services. The NFVO 210 may include a network service catalog 211, a virtual network function (VNF) catalog 212, a network service instance repository 213, a VNF instance repository 214, a NFVI resources repository 215, a NFVO isolation capability repository 216 and a NFVO isolation monitoring function 217.

The network service catalog 211 may maintain a repository of all the on-boarded network services, which can support creation and management of the network service deployment templates/resource models via interface operations exposed by the NFVO 210. The network service deployment templates/resource models may include for example network service descriptor (NSD), virtual link descriptor (VLD), VNF forwarding graph descriptor (VNFFGD) and the like.

The VNF catalog 212 may maintain a repository of all the on-boarded VNF packages including VNF descriptor (VNFD), software images, manifest files, etc., which can support creation and management of the VNF package via interface operations exposed by the NFVO 210. The NFVO 210 and the VNFM 230 can query the VNF catalog 212 to find and retrieve a VNFD in order to support operations such as validation and checking instantiation feasibility.

The network service instance repository 213 includes information of all network service instances, and the VNF instance repository 214 includes information of all VNF instances. Each network service instance is represented by a network service record, and each VNF instance is represented by a VNF record. These records are updated during the lifecycle of the respective instances, reflecting changes resulting from execution of network service lifecycle management operations and/or VNF lifecycle management operations. This supports responsibilities of the NFVO 210 and the VNFM 230 in maintaining integrity and visibility of the network service and VNF instances and the relationship between them.

The NFVI resources repository 215 includes information about available, reserved and allocated NFVI resources as abstracted by the VIM 240 across the network operator's infrastructure domains, thereby supporting information useful for resources reservation, allocation and monitoring purposes. As such, the NFVI resources repository 215 plays an important role in supporting the NFVO's capability of resource orchestration and governance by allowing NFVI reserved/allocated resources to be tracked against the network service and VNF instances associated with those resources.

The NFVO isolation capability repository 216 maintains isolation policies that should be applied during orchestration of a network service instance. For example, the isolation policy may include network service isolation, VNF isolation, virtual compute isolation, virtual storage isolation, hardware location isolation, VNF security-based isolation, virtual link isolation, etc.

The NFVO isolation monitoring function 217 is provided to monitor isolation related data during the CN NSS running, and details thereof will be discussed later.

The VNFM 230 is provided for lifecycle management of VNF instances. The VNFM 230 may include a VNF isolation capability repository 231 which maintains isolation policies relating to VNFs including for example VNFCI isolation, virtual compute isolation, virtual storage isolation, geographical location isolation of hardware which is virtualized to provide virtual resources, VNF security-based isolation, virtual link isolation, etc. The VNFM 230 may also send a VNF's ID (identifier) to a network function management function (NFMF) 220 for service configuration of the VNF.

The NFMF 220, also referred to as element manager (EM), is capable of application level management of physical network functions (PNFs) 222 and VNFs 223. The PNFs and VNFs may be implemented as for example network functions in the 5G network such as a session management function (SMF), a user plane function (UPF), an access and mobility management function (AMF) and the like. When a PNF or a VNF instance is created with allocated resources, the NFMF 220 may configure functions, service parameters or operations of the PNF or VNF. The NFMF 220 may include a PNF isolation capability repository 221 which maintains isolation policies relating to PNFs including for example PNF isolation, compute isolation, storage isolation, geographical location isolation, PNF security-based isolation, physical network link isolation, etc. In some embodiments, the PNF isolation capability repository 221 may also maintain application level isolation policies relating to PNFs and VNFs.

The VIM 240 is provided to control and manage NFVI resources such as virtual compute resources 251, virtual storage resources 252, and virtual network resources 253. The VIM 240 may include a software defined network (SDN) control module 241 to control data traffic of the NFVI resources. The NFVI 250 may store information of the available, reserved and allocated NFVI resources as abstracted by the VIM 240.

Figure 4:
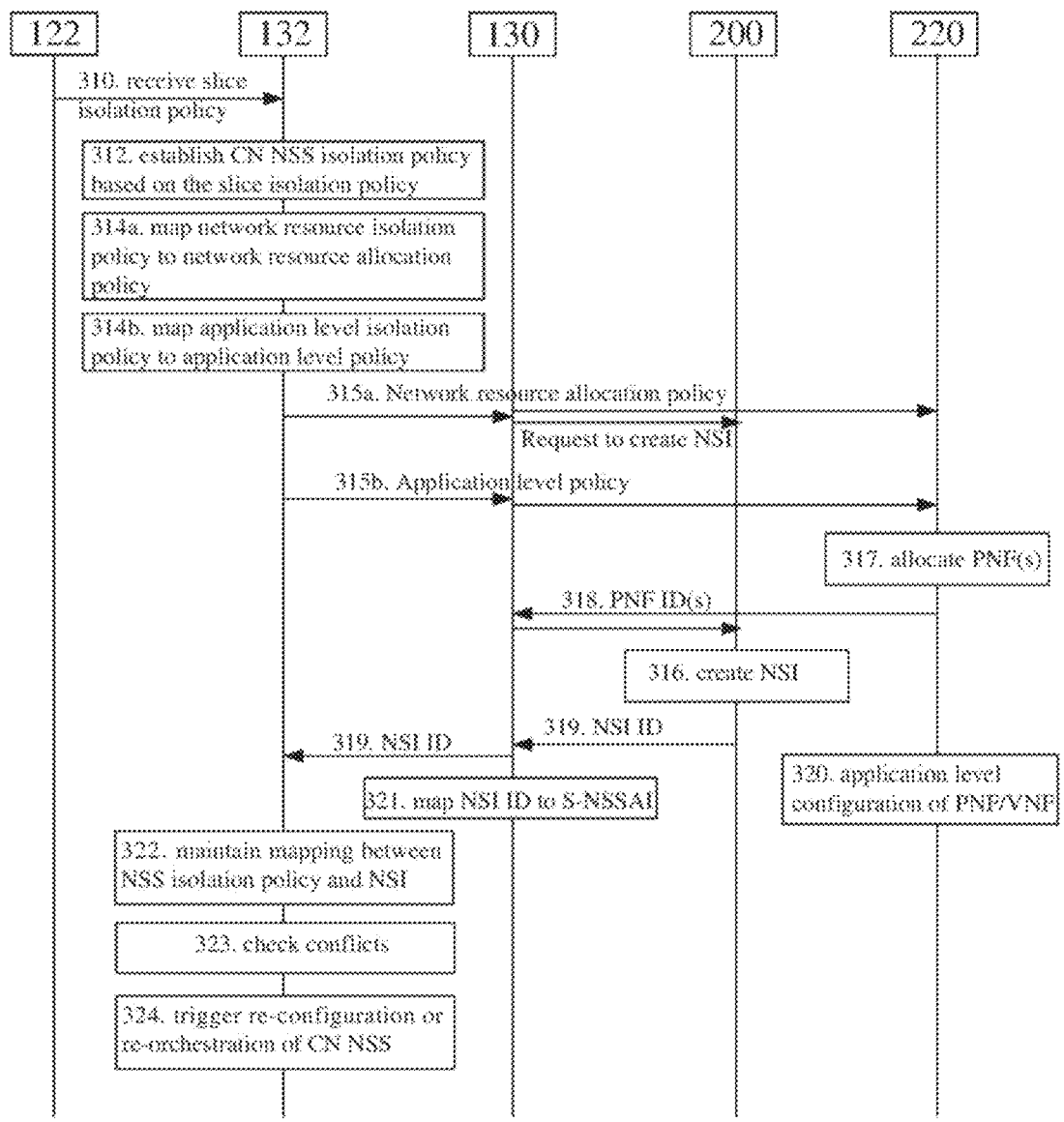
FIG. 4 illustrates an interaction diagram of operations of network management functions for providing isolation in a phase of NSI creation in accordance with some example embodiments.

FIG. 4 illustrates an interaction diagram of operations of network management functions for providing isolation in the core network domain in accordance with some example embodiments. For a better understanding, the below description of interactions shown in FIG. 4 may be read with reference to FIGS. 2-3.

Referring to FIG. 4, the CN isolation control function 132 may receive 310 a slice isolation policy for a network slice subnet (NSS) in the CN domain from the NS layer, i.e., the NSMF 120 or the isolation management function 122 therein. In some embodiments, the CN isolation control function 132 may receive the slice isolation policy directly from the NSMF 120 or via the CN NSSFM 130. Then, the CN isolation control function 132 may establish 312 a CN NSS isolation policy based on the received slice isolation policy. Depending on the slice isolation policy, the CN NSS isolation policy may comprise a data traffic isolation policy, a network resource isolation policy and/or an application level isolation policy. The co-owned PCT patent application No. PCT/CN2020/102006 has disclosed data traffic isolation support in the TN domain and it is also applicable in the CN and AN domains. Therefore, a repetitive description of the data traffic isolation policy is omitted here.

The slice isolation policy received from the NS layer generally includes a high level isolation requirement for the CN NSS. For example, the slice isolation policy may designate only an isolation level defined by Global System for Mobile communication Assembly (GSMA) such as no isolation, physical isolation, or logical isolation. In the operation 310, the CN NSS isolation policy may be established with extended attributes in consideration of the slice isolation policy and the slice profile received from the NS layer. The slice profile specifies characteristics and/or requirements of the network slice to be created, such as application type, security requirements, availability, reliability, latency, mobility and the like, which may be reflected into the CN NSS isolation policy established in the operation 310. For example, a high-level security requirement for the network slice may correspond to a high-level isolation, and a highly reliable application such as a banking service may correspond to user data isolation. Thus, a fine-grained isolation policy may be established for the CN NSS. Depending on the slice isolation policy and the slice profile received from the NS layer, the CN NSS isolation policy may comprise a network resource isolation policy and/or an application level isolation policy. The network resource isolation policy may further comprise physical isolation and logical isolation. The physical isolation may comprise attributes such as dedicated PNF isolation, dedicated physical network link isolation, geographical location isolation, compute isolation, memory isolation, storage isolation, and PNF security-based isolation. The logical isolation may comprise attributes such as dedicated VNF isolation, virtual link isolation, virtual storage isolation, geographical location isolation of hardware which is virtualized to provide virtual resources, and VNF security-based isolation. The application level isolation policy may comprise attributes such as control plane isolation, data plane isolation, management plane isolation, and subscriber data isolation, which may be based on physical isolation or logical isolation. It would be appreciated that the isolation attributes are given here as examples, and other attributes may also be used in the CN NSS isolation policy.

Then, the CN NSS isolation policy is translated into policies that can be implemented and enforced at the NFV-MANO 200 if VNF is involved in the network slice and/or at the NFMF 220 if PNF is involved in the network slice. In particular, in a case where the established CN NSS isolation policy comprises a network resource isolation policy, the CN isolation control function 132 may map 314a the network resource isolation policy to a network resource allocation policy. The network resource allocation policy may comprise isolation related requirements of virtual and/or physical resources for a network service, and an example of the network resource allocation policy is shown in the below Table 1. As shown in Table 1, the fine-grained network resource isolation policy is reflected into descriptors of the network service and physical and logical resources such as PNF, VNF involved in the network service. It would be understood that Table 1 shows only a part of the physical isolation and the logical isolation, and the physical and logical isolation may comprise extended attributes that are mapped to the descriptors of the network service, the PNF and the VNF.

TABLE 1

Example of Network Resource Allocation Policy fine-grained NW resource isolation policy supported in CN NSS domain

| Descriptor of NW service/PNF/VNF | | | physical isolation | NW function isolation | logical isolation — security capability isolation | geographical location isolation | network function provider isolation ... |
|---|---|---|---|---|---|---|---|
| NW service (nsdIdentifier) | PNF | pnfdId | ✓ | ✓ | | ✓ | ✓ |
| | | provider | | | | | ✓ |
| | | geographicalLocationInfo | ✓ | | | ✓ | |
| | | pnfExtCpd | ✓ | | | | |
| | VNF | vnfdId | ✓ | ✓ | ✓ | ✓ | ✓ |
| | | swImageDesc | | | | | |
| | | languageInfo | | | ✓ | | |
| | | provider | | | | | ✓ |
| | | vduId  geographicalHWLocationInfo | ✓ | | | ✓ | |
| | |    virtualComputeDescId | ✓ | ✓ | | | |
| | |    virtualStorageDescId | ✓ | ✓ | | | |
| | |    virtualLinkDescId | ✓ | ✓ | | | |
| | |    virtualTechInfo | ✓ | | ✓ | | |
| | |    virtualSecCapInfo | | | ✓ | | |
| | | virtualLinkDescId | ✓ | ✓ | | | |
| | | vnfSecCapInfo | | | ✓ | | |
| | virtualLinkDescId | | ✓ | ✓ | | | |
| | vnffgdId | | ✓ | | | | |
| | nsSecCapInfo | | | | ✓ | | |

Figure 5:
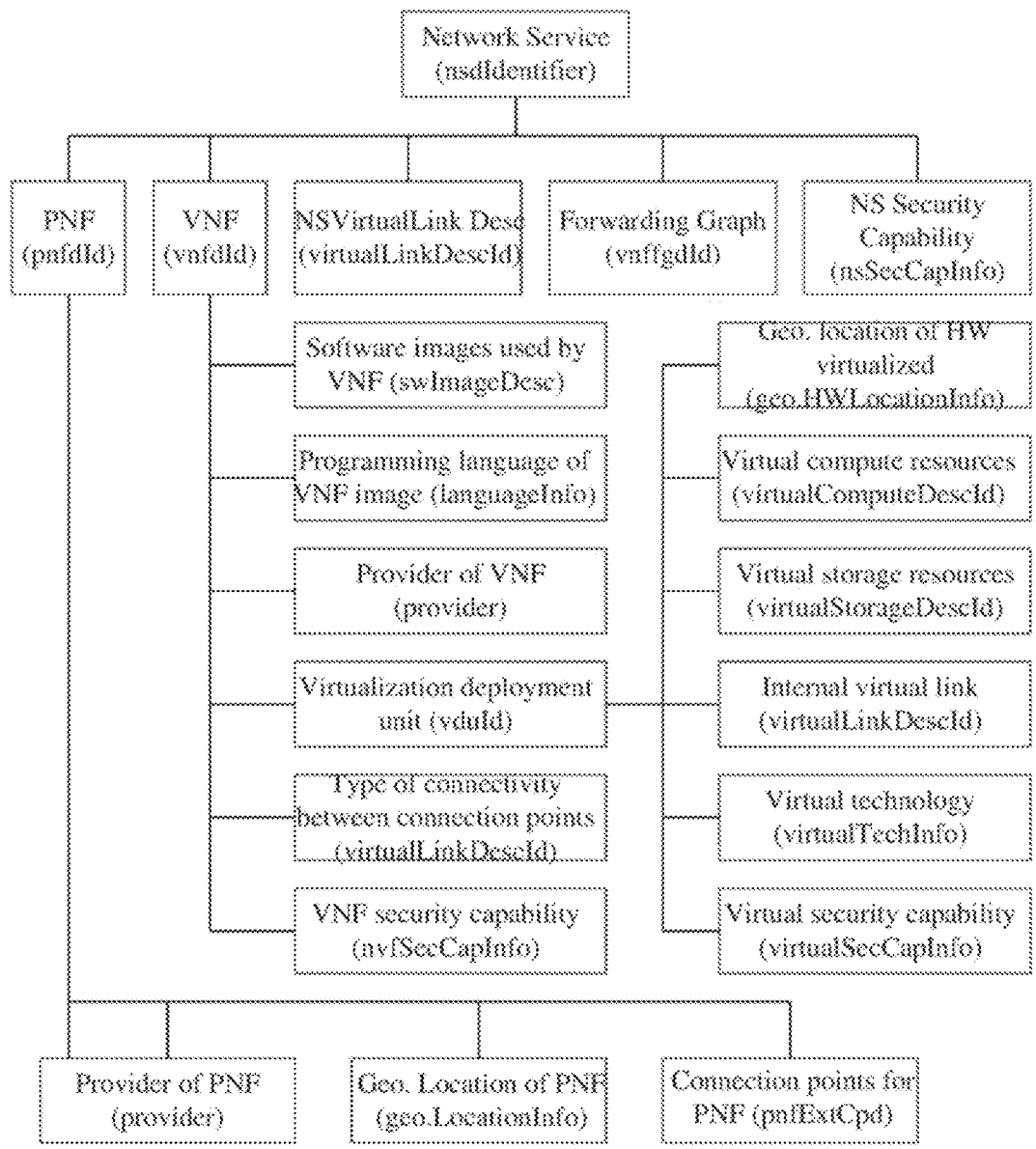
FIG. 5 illustrates a schematic diagram of network service descriptors in accordance with some example embodiments.

For better understanding of the descriptors shown in Table 1, FIG. 5 illustrates a block diagram of the descriptors for the network service, the PNF and the VNF. In FIG. 5, each block shows a descriptor with its information elements such as identifier in parentheses. Referring to Table 1 and FIG. 5, a network service descriptor (NSD) is a network service deployment template/resource mode whose instances are used by the NFVO for lifecycle management of network services. The NSD includes or references descriptors of its constituent objects, such as PNF descriptor, VNF descriptor, network service virtual link descriptor, forwarding graph descriptor and network service security capability descriptor. The network service virtual link descriptor is a deployment template/resource model which describes the resource requirements that are needed for a link between VNFs, PNFs and endpoints of the network service, which can be used by the NFVI 250. The forwarding graph descriptor is a deployment template/resource model which describes a topology of the network service or a portion of the topology by referencing VNFs, PNFs and virtual links that connect them. The network service security capability descriptor is a deployment template/resource model which describes security requirements for the network service such as authentication, authorization, integrity, confidentiality, data filtering, etc. It would be understood that the security capability descriptor included in the NSD would help to support a security-based isolation policy in the network service.

The NSD may include or reference one or more PNF and/or VNF descriptors. The PNF descriptor (PNFD) is included when a PNF is incorporated into the network service and it describes connectivity, interface and KPIs requirements of virtual links to the PNF. The PNFD may include or reference descriptors of provider, geographical location and connection points of the PNF. The VNF descriptor (VNFD) is included when a VNF is involved in the network service and it is a deployment template/resource model which describes the VNF in terms of its deployment and operational behavior requirements. The VNFD is used by the VNFM 230 in VNF instantiation and VNF instance lifecycle management. The VNFD includes or references descriptors of software images to be used by the VNF, programming language of the VNF images, provider of the VNF, virtual deployment unit (VDU), VNF connectivity type and VNF security capability. The descriptor of security capability may include for example access control, confidentiality, integrity, non-repudiation, etc. The VDU descriptor is a deployment template/resource model that describes resource requirements for components of the VNF such as virtual machine (VM), container, etc. The VDU descriptor may include or reference descriptors of geographical location of hardware which is virtualized to provide virtual resources for the VNF, virtual compute resources (such as CPU and memory) including process schedule to be used by the VNF, virtual storage resources to be used by the VNF, internal virtual links of the VNF, virtualization technology of the VNF such as VMWARE, KVM, XEN, Lxc, VirtualBox, Container, Hyper-V, and virtualization security capability of the VNF such as access control, integrity, confidentiality, non-repudiation, hardware security module, trusted platform module, etc.

Referring back to Table 1, in the network resource allocation policy, the network resource isolation policy is related to the NSD. Then, when the NFV-MANO 200 uses the NSD to instantiate a network service, it would allocate resources for the network service instance according to the isolation policy. Thus, the isolation policy is applied in the network service instance created based on the NSD.

Continue referring to FIG. 4, in a case where the established CN NSS isolation policy comprises an application level isolation policy, the CN isolation control function 132 may map 314b the application level isolation policy to an application level policy that comprises isolation related requirements for configuration of a network function such as the PNF 222 and/or the VNF 223. The PNF 222 and the VNF 223 may be implemented as various network functions for the network service such as a Session Management Function (SMF), a User Plane Function (UPF), an Access and Mobility management Function (AMF), a Unified Data Management (UDM) function, a Unified Data Repository (UDR) function and the like, and the application level policy may describe requirements on application level configuration of the PNF and VNF. For example, if the application level isolation policy includes subscriber data isolation, then the corresponding application level policy may describe that a PNF or VNF which is implemented as a Unified Data Management (UDM) function or a Unified Data Repository (UDR) function shall be configured to store the subscriber data in a physically or logically separate database. For another example, if the application level isolation policy includes user plane isolation, then the corresponding application level policy may describe that dedicated UPF shall be configured for the network service.

Then, the CN isolation control function 132 may send 315a the network resource allocation policy relating to physical resources to the NFMF 220 and the network resource allocation policy relating to virtual resources to the NFV-MANO 200, and/or send 315b the application level policy to the NFMF 220. The CN isolation control function 132 may send the policies via the CN NSSMF 130 to the NFV-MANO 200 and the NFMF 220. For example, the CN NSSMF 130 may send a request for creation of a network service instance along with the network resource allocation policy for the network service instance to the NFV-MANO 200.

Responsive to the request to create a network service instance, the NFV-MANO 200 may create 316 the network service instance by orchestrating network functions and other components according to the network resource allocation policy. For example, the NFV-MANO 200 may allocate resources for and orchestrate the network functions and other components with considering of some requirements such as bandwidth, latency for the network service instance and the network resource allocation policy for the network service instance. The orchestrated network service instance may include a plurality of PNFs and/or VNF instances connected with links that form a service chain. The NFV-MANO 200 may receive PNF ID(s) from the CN NSSMF 130 for orchestration of the network service instance if PNF(s) is involved in the network service. In some embodiments, the NFMF 220 may allocate 317, with reference to the PNF isolation capability repository 221, an appropriate PNF that complies with the received network resource allocation policy for the network service and return 318 an ID (identifier) of the PNF to the CN NSSMF 130. The CN NSSMF 130 may forward the PNF ID (identifier) to the NFV-MANO 200 for orchestration of the network service instance. The VNFM 230 of the NFV-MANO 200 may, with assistance of the VNF isolation capability 231, select an existing VNF instance(s) that complies with the network resource allocation policy for the network service. If none of the existing VNF instances complies with the network resource allocation policy, the VNFM 230 may create a new VNF instance by allocating virtual resources for the new VNF instance. The NFV-MANO 200 creates 316 an network service instance based on the PNF(s) and/or the VNF instance(s) and sends 319 an identifier of the created network service instance to the CN NSSMF 130 and thus to the CN isolation control function 132. The NFMF 220 may configure 320 the PNF and/or VNF of the network service instance according to the received application level policy.

The NFMF 220 may receive the VNF instance's ID (identifier) from the CN NSSMF 130 or from the VNFM 230.

The CN NSSMF 130 may map 321 the network service instance to the CN NSS. For example, the CN NSSMF 130 may map the ID (identifier) of the network service instance to single-network slice selection assistance information (S-NSSAI) of the CN NSS that uniquely identifies the network slice. The CN isolation control function 132 may maintain 322 mapping between the NSS isolation policy and the network service instance. In some embodiments, the CN isolation control function 132 may further check 323 if the NSS isolation policy conflicts with other network slices or network slice subnets when the NSS isolation policy is shared by a plurality of network slices or network slice subnets. If confliction is determined at the operation 323, the CN isolation control function 132 may trigger 324 re-configuration and/or re-orchestration of the CN NSS to remove the confliction. For example, if the CN NSS uses a PNF that is shared by another network slice which requires dedicated PNF isolation, the CN isolation control function 132 may trigger re-orchestration of the CN NSS to allocate a different PNF for the CN NSS.

Here some examples of CN NSSs with a corresponding slice isolation policy will be described.

Example 1

A uRLLC NS consumer C1 requests to create a network slice with physical isolation. Consequently, a network slice S-NSSAI-1 is created for this NS consumer. For the CN domain, a CN network slice subnet CN-NSS-1 is created with allocating dedicated PNFs, dedicated network links and VNF deployed at the dedicated servers/hypervisors.

Example 2

An eMBB NS consumer C2 requests to create a network slice with network function isolation, a type of logical isolation. A network slice S-NSSAI-2 is created for this NS consumer. For the CN NSS domain, CN-NSS-2 is created with dedicated VNFs and virtual network links.

Example 3

An mMTC NS consumer C3 requests to create a network slice with geographical location isolation. The network slice S-NSSAI-3 is created for this NS consumer. For the CN NSS domain, CN-NSS-3 is created with PNFs, VNFs and virtual network links which are not located at a specific location for example Loc_A.

Example 4

A gaming service provider NS Consumer C4 requests to create an E2E network slice with logical isolation. It is assumed that the CN-NSS-1, CN-NSS-2, CN-NSS-3 have been created. The NSMF 120 breaks down this request and calls CN/TN/AN NSS management functions 130, 140, 150 separately to create network slice subnets. The NSMF 120 also breaks down E2E network slice isolation policy to separate slice isolation policy for each NSS. The CN isolation control function 132 of the CN NSS domain receives the slice isolation policy and maps the slice isolation policy to a network resource isolation policy comprising "dedicated VNF" and "dedicated virtual network links". It is assumed that no application level isolation is required in this example. The network slice identifier for the requested gaming service provider is S-NSSAI_50. With assistance of the CN isolation control function 132, the CN NSSMF 130 decides to reuse CN-NSS-2 according to the obtained network resource isolation policy. However, both the consumer C2 and the gaming service provider require dedicated network function isolation, so different instances of VNFs should be created for the gaming service. Consequently, CN-NSS-2 is created with different VNF instance identifiers, which is implemented at the NFV layer as discussed above with reference to FIG. 3.

The mapping between the network resource isolation policy and the network service descriptor for Examples 1~4 is shown in below Table 2.

monitoring data to the NFV-MANO 200, or exactly the NFVO isolation monitoring function 217 of the NFVO 210 included in the NFV-MANO 200, and to the NFMF 220. In some embodiments, the request 410 may be omitted and the CN isolation monitoring function 134 may send the request 412 periodically to the NFV-MANO 200 and the NFMF 220.

Responsive to the request 412, the NFV-MANO 200 collects 414a isolation monitoring data relating to virtual resources of the network service instance for the CN NSS, and the NFMF 220 collects 414b isolation monitoring data relating to physical resources and application level isolation requirements of the CN NSS. In particular, the NFV-MANO

TABLE 2

Mapping between network resource isolation policy and network service descriptor

| | | S-NSSAI | | | |
|---|---|---|---|---|---|
| | | S-NSSAI-1 | S-NSSAI-2 | S-NSSAI-3 | S-NSSAI-50 |
| Service type | | URLLC | eMBB | mMTC | eMBB |
| CN NSS | | CN-NSS-1 | CN-NSS-2 | CN-NSS-3 | CN-NSS-2 |
| isolation type | | physical isolation | logical/ network function isolation | logical/ geographical location isolation | logical/ network function isolation |
| PNF | pnfdId[*1] | ✓ | | | ✓ |
| | provider | | | | |
| | geographicalLocationInfo | | | ✓ (not LOC_A) | |
| | pnfExtCpd | ✓ | | | ✓ |
| | pnfSecCapInfo | | | | |
| VNF | vnfdId[*2] | ✓ | ✓vnfdId-1 | ✓ | ✓vnfdId-2 |
| | swImageDesc | | | | |
| | languageInfo | | | | |
| | provider | | | | |
| | vduId  geographicalHWLocationInfo | | | | ✓ (not LOC_A) |
| |     virtualComputeDescId | ✓ | | | |
| |     virtualStorageDescId | ✓ | | | |
| |     virtualLinkDescId | ✓ | | | |
| |     virtualTechInfo | ✓ | | | |
| |     virtualSecCapInfo | | | | |
| | virtualLinkDescId | ✓ | ✓ | | ✓ |
| | vnfSecCapInfo | | | | |
| virtualLinkDescId | | ✓ | ✓ | | ✓ |
| vnffgdId | | ✓ | ✓ | | ✓ |
| nsSecCapInfo | | | | | |

[*1]There may be one or more PNFs, although only one is shown in Table 2.
[*2]There may be one or more VNFs, although only one is shown in Table 2.

Figure 6:
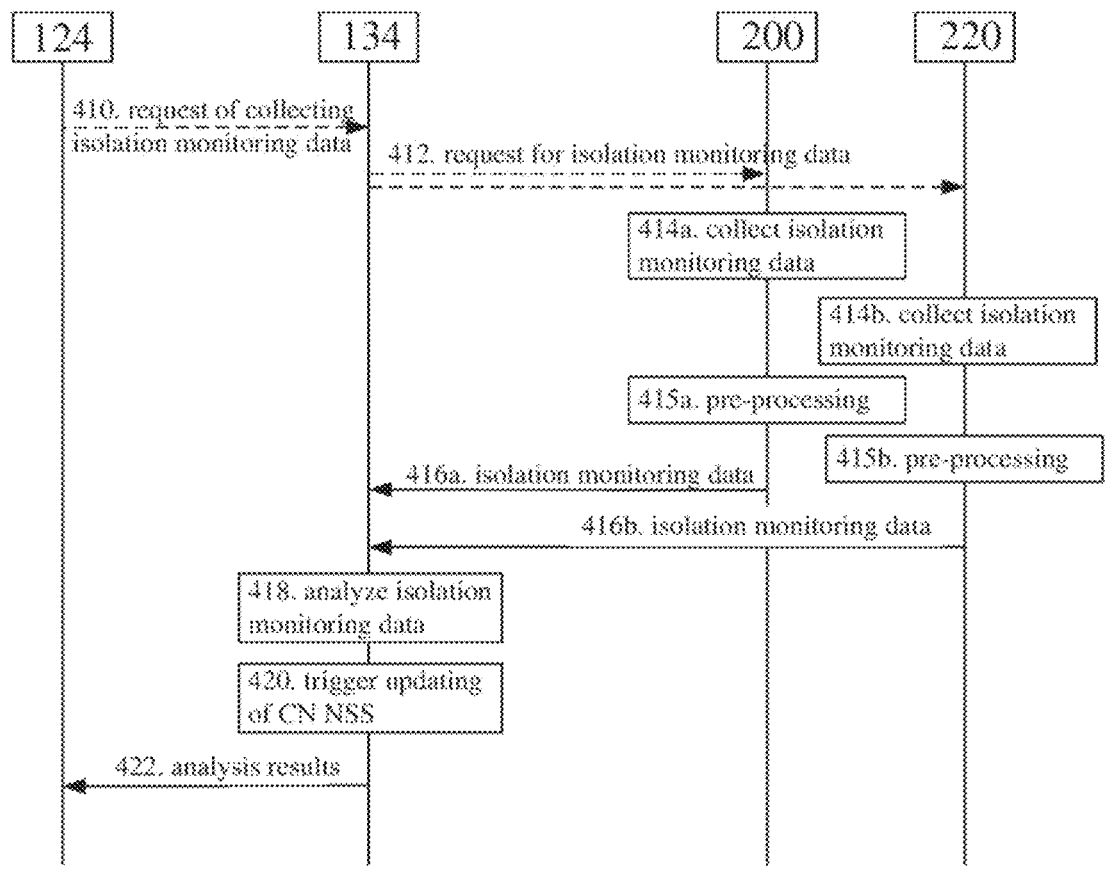
FIG. 6 illustrates an interaction diagram of operations of network management functions for monitoring isolation in a phase of NSI running in accordance with some example embodiments.

FIG. 6 illustrates an interaction diagram of operations of network management functions for monitoring isolation in a phase of network slice running in accordance with some example embodiments. For a better understanding, the below description of interactions shown in FIG. 6 may be read with reference to FIGS. 2-3.

While the network slice is operating to provide services for the tenants, the tenants may want to monitor operation of the network slice to check if the slice isolation policy is correctly enforced. In some embodiments, monitoring of the isolation policy enforcement may be accomplished using isolation monitoring functions deployed at the NS layer and the NSS layer as shown in FIG. 2. Referring to FIG. 6, the isolation monitoring function 124 at the NS layer may send 410 a request for collecting isolation monitoring data to respective domain isolation monitoring functions at the NSS layer, including the CN isolation monitoring function 134. Responsive to the request 410 received from the isolation monitoring function 124, the CN isolation monitoring function 134 may send 412 a request for collecting isolation

200 may collect isolation monitoring data through the NFVO 210, the VNFM 230 and the VIM 240. In some embodiments, the NFV-MANO 200 (or exactly the NFVO 210 and the VNFM 230) may pre-process 415a the collected isolation monitoring data with reference to isolation policies maintained at the NFVO isolation capability repository 216 and the VNF isolation capability repository 231. If the collected monitoring data is not relevant to the isolation policies for the CN NSS, the NFV-MANO 200 may disregard the data. Then, the NFV-MANO 200 can send 416a isolation relevant monitoring data to the CN isolation monitoring function 134, and the bandwidth can be saved. Similarly, the NFMF 220 may also pre-process 415b the collected isolation monitoring data with reference to isolation policies maintained at the PNF/application level isolation capability repository 221. If the collected monitoring data is not relevant to the isolation policies for the CN NSS, the NFMF 220 may disregard the data. Then, the NFMF 220 can send 416b isolation relevant monitoring data to the CN isolation monitoring function 134, and the bandwidth can be saved.

In some embodiments, the request 412 may also be omitted. The NFV-MANO 200 and the NFMF 220 may periodically collect, pre-process and report isolation monitoring data to the CN isolation monitoring function 134.

The CN isolation monitoring function 134 may analyze 418 the received isolation monitoring data to determine if the network resource isolation policy and/or the application level isolation policy are correctly enforced during the CN NSS running. The CN isolation monitoring function 134 may report 422 the analysis results, optionally along with the original isolation monitoring data, to the NS isolation monitoring function 124. In some embodiments, the CN isolation monitoring function 134 may also trigger 420 re-configuration and/or re-orchestration of the CN NSS to comply with the network resource isolation policy and/or the application level isolation policy if it is determined at the operation 418 that the network resource isolation policy and/or the application level isolation policy are not correctly enforced during the CN NSS running.

Embodiments of isolation applying and monitoring procedures in the CN NSS domain have been discussed above with reference to FIGS. 1-6. As seen, a fine-grained isolation policy, including a network resource isolation policy, an application level isolation policy, and a data traffic isolation policy, is well supported in the CN domain. It would be appreciated that the above embodiments may also be applied in the AN domain in a similar way.

Figure 7:
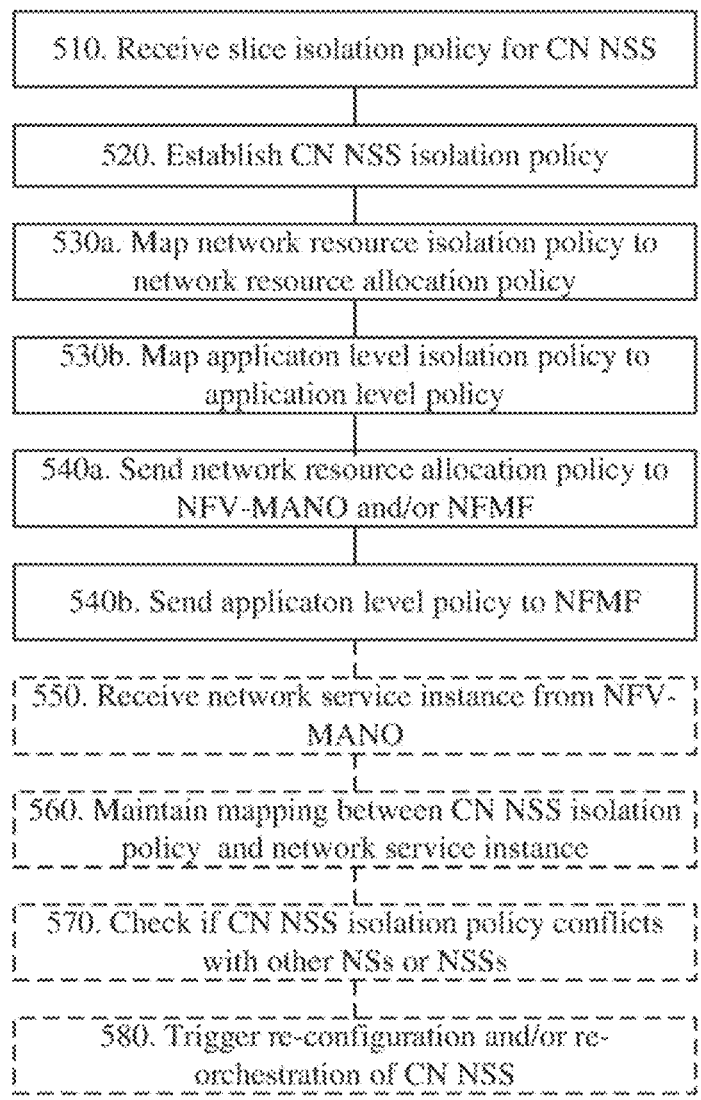
FIG. 7 illustrates a flow chart of a method for isolation in the CN domain of a network slice in accordance with some example embodiments.

FIG. 7 illustrates a flow chart of a method 500 for supporting isolation in the CN domain of a network slice in accordance with some example embodiments. The method 500 may be performed for example at a network management function unit such as the CN isolation management function 132 shown in FIG. 3.

Referring to FIG. 7, the example method 500 may include a step 510 of receiving a slice isolation policy for a NSS in the CN domain and a step 520 of establishing a CN NSS isolation policy based on the received slice isolation policy.

The slice isolation policy for the CN NSS may be for example a high level isolation policy received in or along with the slice profile for the CN NSS from the NSMF 120. In the step 520, the slice isolation policy is mapped to the CN NSS isolation policy with extended attributes as discussed above. The CN NSS isolation policy may include a network resource isolation policy and/or an application level isolation policy.

In a case of the network resource isolation policy, the method 500 may include a step 530a of mapping the network resource isolation policy to a network resource allocation policy comprising isolation related requirements of virtual and/or physical resources for the CN NSS. An example of the network resource allocation policy is shown in the above Table 1. In a step 540a, the network resource allocation policy relating to the physical resources may be sent to the NFMF 220, and/or the network resource allocation policy relating to the virtual resources may be sent to the NFV-MANO 200 for instantiation of a network service.

In a case of the application level isolation policy, the method 500 may include a step 530b of mapping the application level isolation policy to an application level policy comprising isolation related requirements for configuring a network function. The application level policy describes requirements for application level configuration of the network function to achieve the application level isolation policy. In a step 540b, the application level policy may be sent to the NFMF 220 for configuring one or more network functions.

Optionally, the method 500 may further comprise a step 550 of receiving information such as ID (identifier) of a network service instance for the CN NSS from the NFV-MANO and a step 560 of maintaining mapping between the CN NSS isolation policy and the network service instance for the CN NSS. In some embodiments, the ID (identifier) of the network service instance may be related to S-NSSAI of the CN NSS.

In some embodiments, the method 500 may optionally comprise a step 570 of checking if the CN NSS isolation policy conflicts with other network slices or network slice subnets when the CN NSS isolation policy is shared by a plurality of network slices or network slice subnets. If conflict is determined, the method 500 may comprise a step 580 of triggering re-configuration and/or re-orchestration of the CN NSS to remove the conflict.

Figure 8:
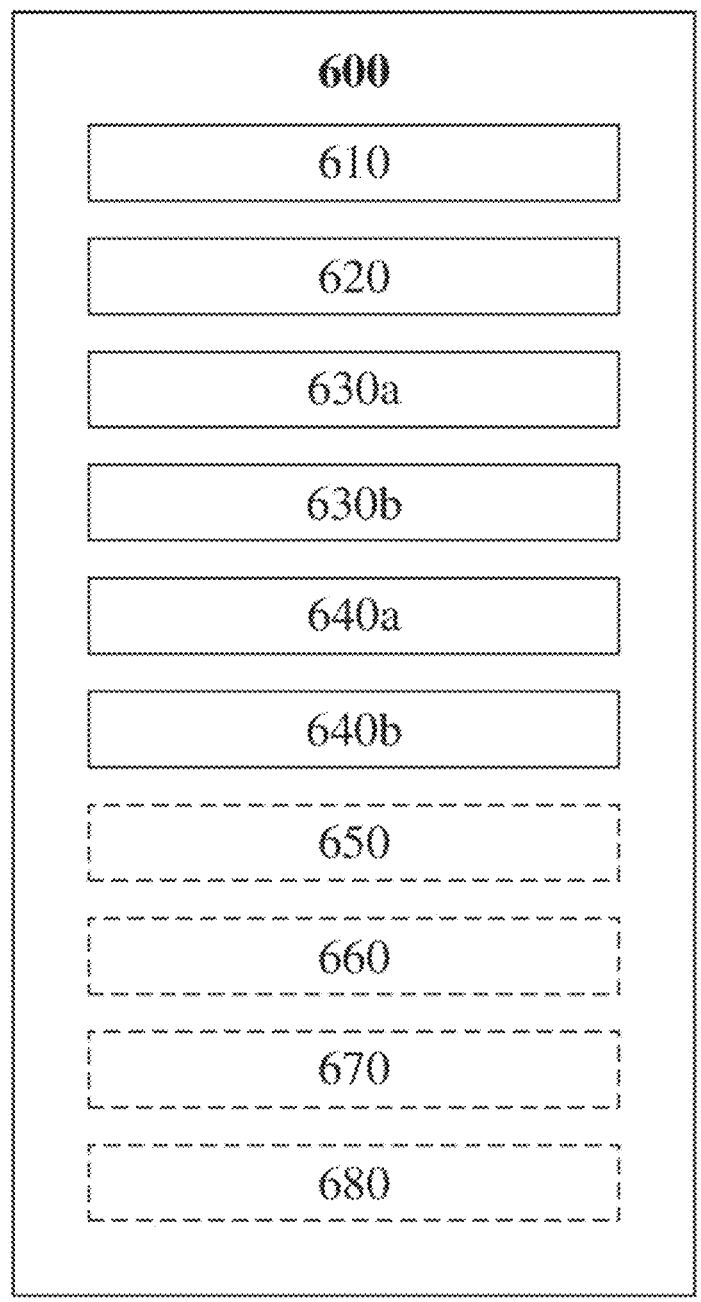
FIG. 8 illustrates a block diagram of an apparatus in accordance with some example embodiments.

FIG. 8 illustrates a block diagram of an apparatus 600 in accordance with some example embodiments. The apparatus 600 may be implemented in for example the CN isolation control function 132 to perform the method 500 shown in FIG. 7. Referring to FIG. 8, the apparatus 600 may include a first means (or module or unit) 610 for performing the step 510 of the method 500, a second means 620 for performing the step 520 of the method 500, a third means 630a for performing the step 530a of the method 500, a fourth means 630b for performing the step 530b of the method 500, a fifth means 640a for performing the step 540a of the method 500 and a sixth means 640b for performing the step 540b of the method 500. Optionally, the apparatus 600 may further include a seventh means 650 for performing the step 550 of the method 500, an eighth means 660 for performing the step 560 of the method 500, a ninth means 670 for performing the step 570 of the method 500 and a tenth means 680 for performing the step 580 of the method 500.

Figure 9:
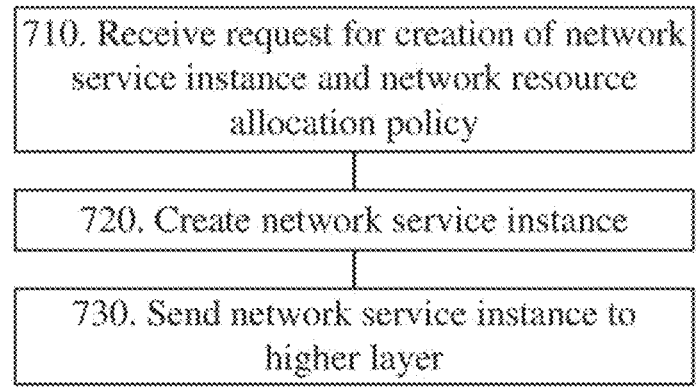
FIG. 9 illustrates a flow chart of a method for isolation in the CN domain of a network slice in accordance with some example embodiments.

FIG. 9 illustrates a flow chart of a method 700 for supporting isolation in the CN domain of a network slice in accordance with some example embodiments. The method 700 may be performed for example at a network management function unit such as the NAF-MANO 200 shown in FIG. 3.

Referring to FIG. 9, the method 700 may include a step 710 of receiving from the CN NSSMF 130 a request of creating a network service instance and a network resource allocation policy for the network service instance. The network resource allocation policy may comprise fine-grained isolation related requirements for virtual resources of the network service instance, such as the VNF, the virtual links, the forwarding graph and security capabilities. An example of the network resource allocation policy is shown in the above Table 1. At a step 720, the NAF-MANO 200 may create the network service instance by orchestrating network functions and other components for the network service according to the network resource allocation policy. In an PNF is involved in the network service, the NAF-MANO 200 may also receive an ID (identifier) of the PNF for orchestration of the network service. Then, at a step 730, the NAF-MANO 200 sends the created network service instance's ID to the CN NSSMF 130.

Figure 10:
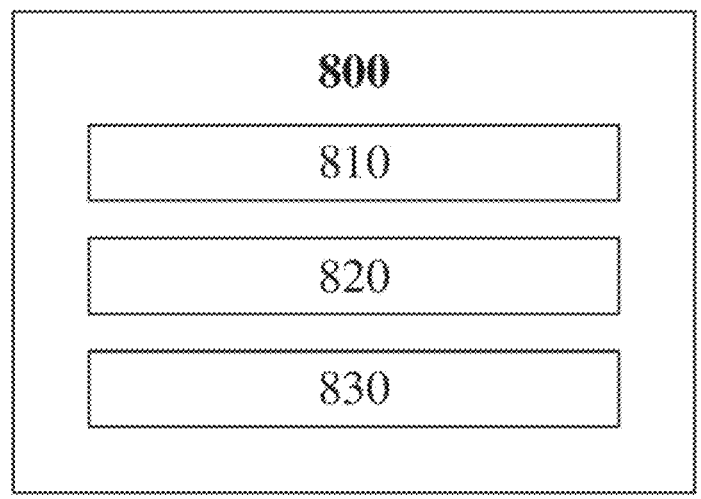
FIG. 10 illustrates a block diagram of an apparatus in accordance with some example embodiments.

FIG. 10 illustrates a block diagram of an apparatus 800 in accordance with some example embodiments. The apparatus 800 may be implemented in for example the NFV-MANO 200 to perform the method 700 shown in FIG. 9. Referring to FIG. 10, the apparatus 800 may include a first means (or module or unit) 810 for performing the step 710 of the method 700, a second means 820 for performing the step 720 of the method 700, and a third means 830 for performing the step 730 of the method 700.

Figure 11:
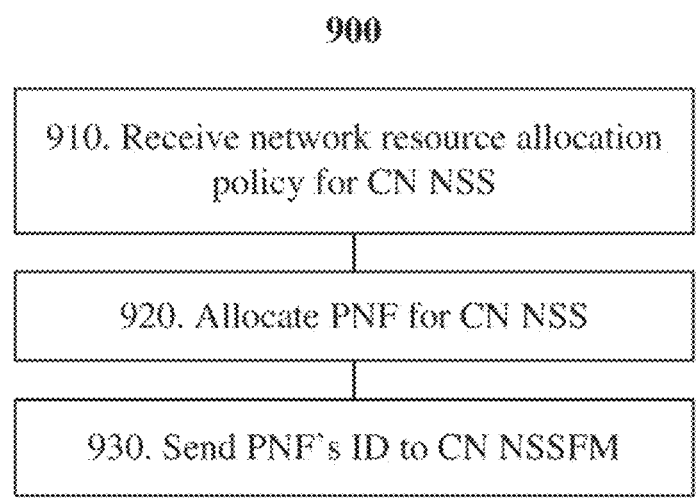
FIG. 11 illustrates a flow chart of a method for isolation in the CN domain of a network slice in accordance with some example embodiments.

FIG. 11 illustrates a flow chart of a method 900 for supporting isolation in the CN domain of a network slice in accordance with some example embodiments. The method 900 may be performed for example in a network management unit such as the NFMF 220 shown in FIG. 3.

Referring to FIG. 11, the method 900 may include a step 910 of receiving a network resource allocation policy for a CN NSS from the CN NSSMF 130. The received network resource allocation policy may comprise isolation related requirements for physical resources of the CN NSS, such as isolation requirements on provider, location and connection points of a PNF. The NFMF 220 may allocate a PNF for the CN NSS according to the network resource allocation policy at a step 920 and return the PNF's ID (identifier) to the CN NSSMF 130 at a step 930. The CN NS SMF 130 may forward the PNF's ID (identifier) to the NFV-MANO 200 for orchestration of a network service.

Figure 12:
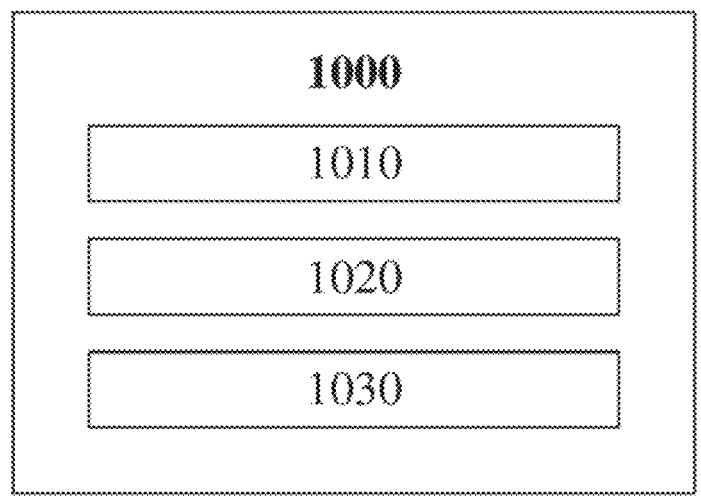
FIG. 12 illustrates a block diagram of an apparatus in accordance with some example embodiments.

FIG. 12 illustrates a block diagram of an apparatus 1000 in accordance with some example embodiments. The apparatus 1000 may be implemented in for example the NFMF 220 to perform the method 900 shown in FIG. 11. Referring to FIG. 12, the apparatus 1000 may include a first means (or module or unit) 1010 for performing the step 910 of the method 900, a second means 1020 for performing the step 920 of the method 900, and a third means 1030 for performing the step 930 of the method 900.

Figure 13:
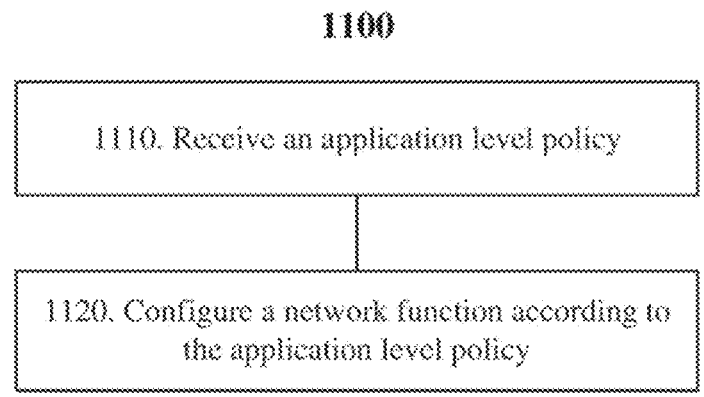
FIG. 13 illustrates a flow chart of a method for isolation in the CN domain of a network slice in accordance with some example embodiments.

FIG. 13 illustrates a flow chart of a method 1100 for supporting application level isolation in the CN domain of a network slice in accordance with some embodiments. The method 1100 may be performed for example at a network management unit such as the NFMF 220 shown in FIG. 3.

Referring to FIG. 13, the method 1100 may include a step 1110 of receiving an application level policy for a CN NSS from the CN NSSMF 130. The application level policy may comprise application level isolation related requirements for a network function such as a PNF or a VNF. At a step 1120, the NFMF 220 may configure at least one network function according to the application level policy so that the network function complies with the application level isolation requirements.

Figure 14:
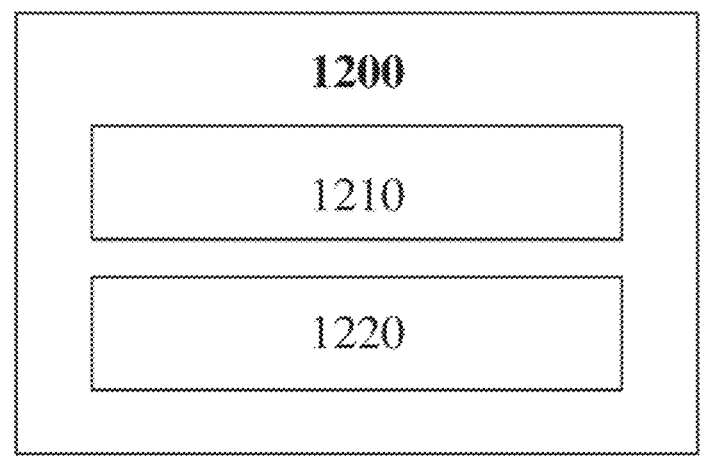
FIG. 14 illustrates a block diagram of an apparatus in accordance with some example embodiments.

FIG. 14 illustrates a block diagram of an apparatus 1200 in accordance with some example embodiments. The apparatus 1200 may be implemented for example in the NFMF 220 to perform the method 1100 shown in FIG. 13. Referring to FIG. 14, the apparatus 1200 may include a first means (or module or unit) 1210 for performing the step 1110 of the method 1100, and a second means 1220 for performing the step 1120 of the method 1100.

Figure 15:
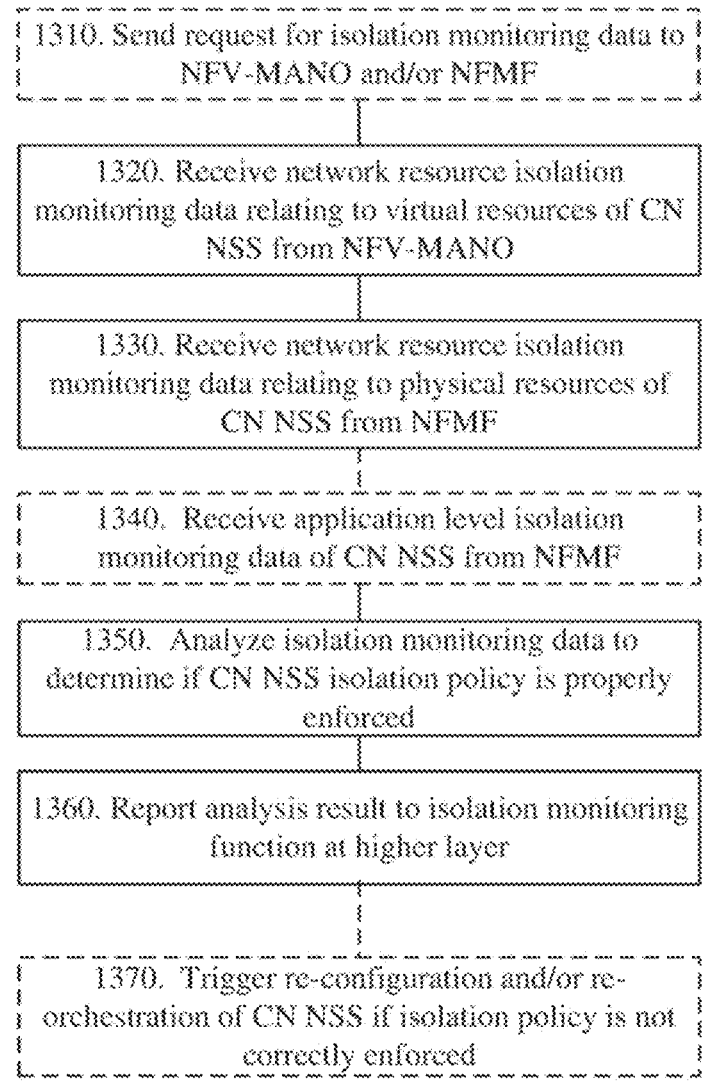
FIG. 15 illustrates a flow chart of a method for isolation in the CN domain of a network slice in accordance with some example embodiments.

FIG. 15 illustrates a flow chart of a method 1300 for monitoring isolation in the CN domain of a network slice in accordance with some example embodiments. The method 1300 may be performed for example at a network management unit such as the CN isolation monitoring function 134 of the CN NSSMF 130 shown in FIG. 3.

Referring to FIG. 15, the method 1300 may include a step 1310 of sending a request for collecting isolation monitoring data of a CN NSS to the NFV-MANO 200 and/or the NFMF 220. The request may be sent periodically or in response to an instruction of collecting isolation monitoring data from an isolation monitoring function at a higher layer, for example the isolation monitoring function 124 at the NS layer. In some embodiments, the step 1310 may be omitted. At a step 1320, the CN isolation monitoring function 134 may receive network resource isolation monitoring data relating to virtual resources of the CN NSS from the NFV-MANO 220, and at a step 1330, the CN isolation monitoring function 134 may receive network resource isolation monitoring data relating to physical resources of the CN NSS from the NFMF 220. Optionally, the CN isolation monitoring function 134 may also receive application level isolation monitoring data of the CN NSS from the NFMF 220 at a step 1340. Then at a step 1350, the CN isolation monitoring function 134 may analyze the received isolation monitoring data, including the network resource isolation monitoring data relating to virtual resources, the network resource isolation monitoring data relating to physical resources, and/or the application level isolation monitoring data of the CN NSS, to determine if the CN NSS isolation policy including the network resource isolation policy and/or the application level isolation policy is correctly enforced during the network slice running. At a step 1360, the CN isolation monitoring function 134 may report the analysis results, optionally together with the original isolation monitoring data, to the isolation monitoring function at the higher layer, for example the isolation monitoring function 124 at the NS layer. Optionally, if it is determined at the step 1350 that the CN NSS isolation policy is not correctly enforced during the network slice running, the CN isolation monitoring function 134 may also trigger re-configuration and/or re-orchestration of the CN NSS to comply with the CN NSS isolation policy.

Figure 16:
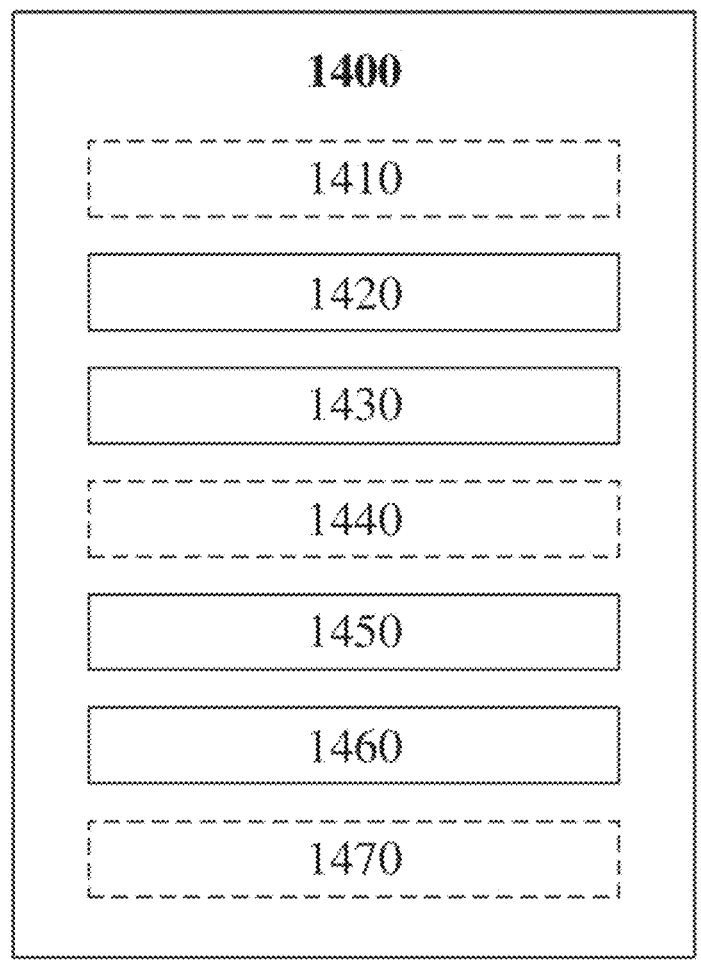
FIG. 16 illustrates a block diagram of an apparatus in accordance with some example embodiments.

FIG. 16 illustrates a block diagram of an apparatus 1400 in accordance with some example embodiments. The apparatus 1400 may be implemented for example in the CN isolation monitoring function 134 to perform the method 1300 shown in FIG. 15. Referring to FIG. 15, the apparatus 1400 may include a first means (or module or unit) 1410 for performing the step 1310 of the method 1300, a second means 1420 for performing the step 1320 of the method 1300, a third means 1430 for performing the step 1330 of the method 1300, a fourth means 1440 for performing the step 1340 of the method 1300, a fifth means 1450 for performing the step 1350 of the method 1300, a sixth means 1460 for performing the step 1360 of the method 1300, and a seventh means 1470 for performing the step 1370 of the method 1300.

Figure 17:
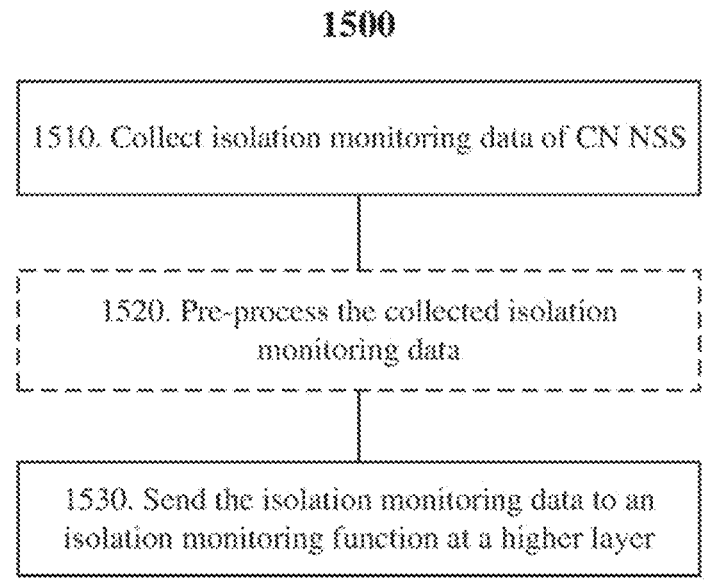
FIG. 17 illustrates a flow chart of a method for isolation in the CN domain of a network slice in accordance with some example embodiments.

FIG. 17 illustrates a flow chart of a method 1500 for monitoring network resource isolation in the CN domain of a network slice in accordance with some embodiments. The method 1500 may be performed for example at a network management unit such as the NFVO isolation monitoring function 217 of the NFV-MANO 200 shown in FIG. 3.

Referring to FIG. 17, the method 1500 may include a step 1510 of collecting isolation monitoring data relating to virtual resources of a CN NSS. The NFV-MANO 200 may collect the isolation monitoring data through the NFVO 210, the VNFM 230 and the VIM 240. The NFV-MANO 200 may collect the isolation monitoring data periodically during the network slice running or in response to a request form the isolation monitoring data from a higher layer for example the CN isolation monitoring function 134 at the NSS layer. The NFV-MANO 200 may pre-process the collected isolation monitoring data with reference to isolation policies maintained at the NFVO isolation capability repository 216 and the VNF isolation capability repository 231 at a step 1520. If the collected isolation monitoring data is not relevant to the isolation policies for the CN NSS, the NFV-MANO 200 may disregard the data. Then at a step 1530, the NFV-MANO 200 may send the isolation monitoring data to an isolation monitoring function at a higher layer such as the CN isolation monitoring function 134 at the NSS layer.

Figure 18:
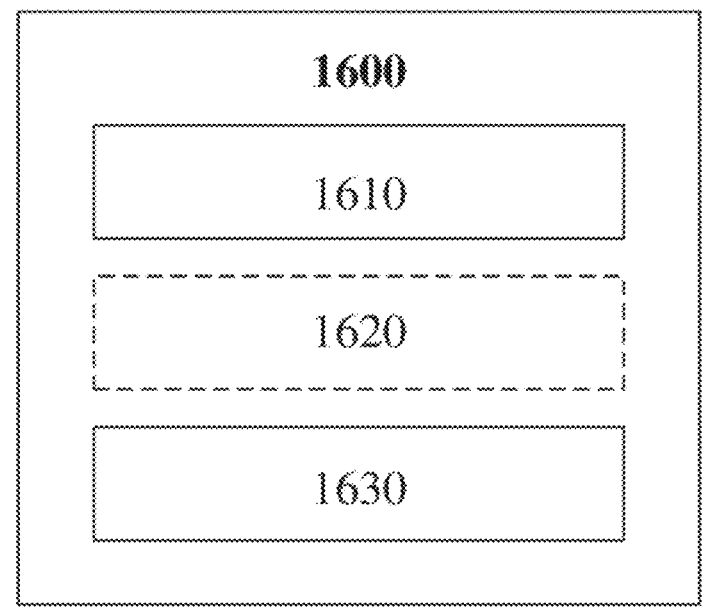
FIG. 18 illustrates a block diagram of an apparatus in accordance with some example embodiments.

FIG. 18 illustrates a block diagram of an apparatus 1600 in accordance with some example embodiments. The apparatus 1600 may be implemented for example in the NFVO isolation monitoring function 217 of the NFV-MANO 200 to perform the method 1500 shown in FIG. 17. Referring to FIG. 18, the apparatus 1600 may include a first means (or module or unit) 1610 for performing the step 1510 of the method 1500, a second means 1620 for performing the step 1520 of the method 1500, and a third means 1630 for performing the step 1530 of the method 1500.

The methods 500, 700, 900, 1100, 1300, 1500 and the apparatus 600, 800, 1000, 1200, 1400, 1600 have been discussed briefly with reference to FIGS. 7-18. Details of the methods and the apparatus may also refer to the network management functions and procedures discussed above with reference to FIGS. 1-6.

Figure 19:
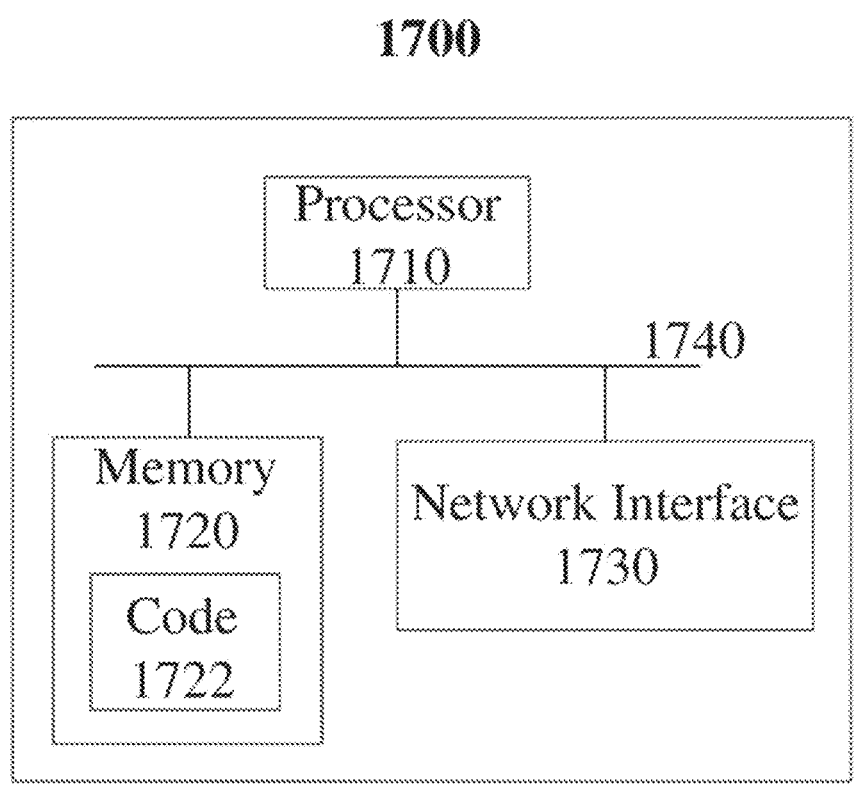
FIG. 19 illustrates a block diagram of a network management function unit in accordance with some example embodiments.

FIG. 19 illustrates a block diagram of a network management unit 1700 in accordance with some example embodiments. The network management unit 1700 may be implemented as any one of the network management functions discussed above to perform the operations and/or methods relating to applying and monitoring fine-grained isolation policies in the CN domain of a network slice. In some embodiments, two or more network management functions may be implemented together as the network function unit 1700. For example, the NS isolation management function 122 and the NS isolation monitoring function 124, or the CN isolation control function 132 and the CN isolation monitoring function 134, may be implemented together as the network management unit 1700.

Referring to FIG. 19, the network management unit 1700 may include one or more processors 1710, one or more memories 1720 and one or more network interfaces 1730 interconnected together through one or more buses 1740. The one or more buses 1740 may be address, data, or control buses, and may include any interconnection mechanism such as series of lines on a motherboard or integrated circuit, fiber, optics or other optical communication equipment, and the like. The one or more network interfaces 1730 are provided to support wired and/or wireless communications with other network functions, units, elements or nodes. In some embodiments, the one or more network interfaces 1730 may implement for example NG interfaces or Xn interfaces. The one or more memories 1720 may include computer program code 1722. The one or more memories 1720 and the computer program code 1722 may be configured to, when executed by the one or more processors 1710, cause the network management unit 1700 to perform operations and/or methods as described above.

The one or more processors 1710 may be of any appropriate type that is suitable for the local technical network, and may include one or more of general purpose processors, special purpose processor, microprocessors, a digital signal processor (DSP), one or more processors in a processor based multi-core processor architecture, as well as dedicated processors such as those developed based on Field Programmable Gate Array (FPGA) and Application Specific Integrated Circuit (ASIC). The one or more processors 1710 may be configured to control other elements of the network management unit and operate in cooperation with them to implement the procedures discussed above.

The one or more memories 1720 may include at least one storage medium in various forms, such as a volatile memory and/or a non-volatile memory. The volatile memory may include but not limited to for example a random access memory (RAM) or a cache. The non-volatile memory may include but not limited to for example a read only memory (ROM), a hard disk, a flash memory, and the like. Further, the one or more memories 1220 may include but not limited to an electric, a magnetic, an optical, an electromagnetic, an infrared, or a semiconductor system, apparatus, or device or any combination of the above.

It would be understood that blocks shown in the drawings may be implemented in various manners, including software, hardware, firmware, or any combination thereof. In some embodiments, one or more blocks may be implemented using software and/or firmware, for example, machine-executable instructions stored in the storage medium. In addition to or instead of machine-executable instructions, parts or all of the blocks in the drawings may be implemented, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-Chip systems (SOCs), Complex Programmable Logic Devices (CPLDs), etc.

Some exemplary embodiments further provide computer program code or instructions which, when executed by one or more processors, may cause a device or apparatus to perform the procedures described above. The computer program code for carrying out procedures of the exemplary embodiments may be written in any combination of one or more programming languages. The computer program code may be provided to one or more processors or controllers of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

Some exemplary embodiments further provide a computer program product embodied in a computer readable medium comprising the computer program code or instructions. The computer readable medium may be any tangible medium that may contain, or store a program for use by or in connection with an instruction execution system, apparatus, or device. The machine readable medium may be a machine readable signal medium or a machine readable storage medium. A machine readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in a language that is specific to structural features and/or method actions, it is to be understood the subject matter defined in the appended claims is not limited to the specific features or actions described above. On the contrary, the above-described specific features and actions are disclosed as an example of implementing the claims.

What is claimed is:

1. A method for isolation of a network slice (NS) in a core network (CN) domain comprising:
   receiving a slice isolation policy for a network slice subnet (NSS) in the CN domain;
   establishing an NSS isolation policy for the CN NSS based on the slice isolation policy, the NSS isolation policy comprising at least one of a network resource isolation policy and an application level isolation policy;
   in a case where the NSS isolation policy comprises the network resource isolation policy:
     mapping the network resource isolation policy to a network resource allocation policy comprising isolation related requirements of virtual and/or physical resources for a network service; and
     sending the network resource allocation policy relating to the physical resources to a network function management function (NFMF) and/or the network resource allocation policy relating to the virtual resources to a network function virtualization management and orchestration (NFV-MANO) function for instantiation of the network service; and
   in a case where the NSS isolation policy comprises the application level isolation policy:
     mapping the application level isolation policy to an application level policy comprising isolation related requirements for configuration of a network function; and
     sending the application level policy to the NFMF for configuring of one or more network functions.

2. The method of claim 1 further comprising:
   receiving from the NFV-MANO information of a network service instance for the CN NSS; and
   maintaining mapping between the NSS isolation policy and the network service instance for the CN NSS.

3. The method of claim 1 further comprising:
   checking if the NSS isolation policy for the CN NSS conflicts with other network slices or NSSs when the NSS isolation policy is shared by the CN NSS and the other network slices or NSSs; and
   triggering re-configuration and/or re-orchestration for the CN NSS to remove the confliction.

4. The method of claim 1 wherein the network resource isolation policy comprises one or more of physical isolation and logical isolation,
   the physical isolation comprising one or more of dedicated physical network function (PNF) isolation, dedicated physical network link isolation, geographical location isolation, compute isolation, memory isolation, storage isolation, and PNF security-based isolation,
   the logical isolation comprising one or more of virtual network function (VNF) isolation, virtual link isolation, virtualization technology isolation, virtual compute isolation, virtual memory isolation, virtual storage isolation, geographical location isolation of hardware which is virtualized to provide virtual resources, and VNF security-based isolation, and
   wherein the application level isolation policy comprising one or more of control plane isolation, data plane isolation, management plane isolation, and subscriber data isolation.

5. A network management unit comprising:
   at least one processor; and
   at least one memory including computer program code, the at least one memory and the computer program code configured to, with the at least one processor, cause the network management unit to:
     receive a slice isolation policy for a network slice subnet (NSS) in the CN domain;
     establish an NSS isolation policy for the CN NSS based on the slice isolation policy, the NSS isolation policy comprising at least one of a network resource isolation policy and an application level isolation policy;
     in a case where the NSS isolation policy comprises the network resource isolation policy:
       map the network resource isolation policy to a network resource allocation policy comprising isolation related requirements of virtual and/or physical resources for a network service; and
       send the network resource allocation policy relating to the physical resources to a network function management function (NFMF) and/or the network resource allocation policy relating to the virtual resources to a network function virtualization management and orchestration (NFV-MANO) function for instantiation of the network service; and in a case where the NSS isolation policy comprises the application level isolation policy:
       map the application level isolation policy to an application level policy comprising isolation related requirements for configuration of a network function; and
       send the application level policy to the NFMF for configuring of one or more network functions.

6. The network management unit of claim 5 wherein the at least one memory and the computer program code are further configured to, with the at least one processor, cause the network management unit to:
   receive from the NFV-MANO information of a network service instance for the CN NSS; and
   maintain mapping between the NSS isolation policy and the network service instance for the CN NSS.

7. The network management unit of claim 5 wherein the at least one memory and the computer program code are further configured to, with the at least one processor, cause the network management unit to:
   check if the NSS isolation policy for the CN NSS conflicts with other network slices or NSSs when the NSS isolation policy is shared by the CN NSS and the other network slices or NSSs; and
   trigger re-configuration and/or re-orchestration for the CN NSS to remove the confliction.

8. A non-transitory computer readable medium having instructions stored thereon, the instructions, when executed by at least one processor of a network management unit, causing the network management unit to perform a method of claim 1.

* * * * *